United States Patent [19]
Gallegos et al.

[11] Patent Number: 5,612,901
[45] Date of Patent: Mar. 18, 1997

[54] APPARATUS AND METHOD FOR CLOUD MASKING

[76] Inventors: Sonia C. Gallegos, 122 Cedarwood Dr., Slidell, La. 70461; Ronald J. Holyer, 1640 Harbor Dr., No. 111, Slidell, La. 70458; Sarah H. Peckinpaugh, P.O. Box 1018, Ocean Springs, Miss. 39564; Chiu-Fu Cheng, 1110 Highland Dr., Picayune, Miss. 39466

[21] Appl. No.: 245,118

[22] Filed: May 17, 1994

[51] Int. Cl.⁶ .............................. G01J 5/00; G06F 17/00
[52] U.S. Cl. ........................ 364/526; 348/144; 382/163
[58] Field of Search .............................. 364/525, 526, 364/550, 578, 571.03; 382/162, 163; 348/144, 164

[56] References Cited

U.S. PATENT DOCUMENTS 4,227,211  10/1980  Disbrow ................................. 348/164
5,075,856  12/1991  Kneizys et al. ..................... 364/578 X

OTHER PUBLICATIONS

Gallegos et al., "A New Automated Method of Cloud Masking for Advanced Very High Resolution Radiometer Full-Resolution Data Over the Ocean", printed in J. Geophys. Res., vol. 98, No. C5, pp. 8505–8516, May 15, 93.

*Primary Examiner*—Emanuel T. Voeltz
*Assistant Examiner*—Edward Pipala

[57] ABSTRACT

The presently disclosed invention relates to an apparatus and method for collecting satellite images of bodies of water such as the oceans and removing interfering clouds from the satellite images to improve the accuracy of the images. More particularly, the presently disclosed invention relates to the use of an apparatus and method to extract cloud edge information through local segmentation of the image and a procedure to discriminate between cloud free and cloud contaminated pixels. The cloud contaminated pixels are then removed from daytime and nighttime 1-km advanced very high resolution radiometer (AVHRR) satellite image.

16 Claims, 20 Drawing Sheets

(10 of 20 Drawing(s) in color)

FIG. 12

| | $M_0$ | $M_1$ | $M_2$ | $M_3$ | |
|---|---|---|---|---|---|
| $N_0$ | | | | | N |
| $N_1$ | | -0.196 | -1.440 | 0.111 | |
| $N_2$ | | -0.705 | -0.240 | -0.016 | |
| $N_3$ | | -0.914 | 0.552 | -0.402 | |

|   | 2 | 2 | 2 | 2 | 2 | 0 | . | . |
|---|---|---|---|---|---|---|---|---|
|   | 2 | 2 | 1 | 0 | 1 | 2 | . | . |
|   | 2 | 1 | 0 | 0 | 2 | 1 | . | . |
|   | 2 | 1 | 0 | 0 | 1 | 2 | . | . |
|   | 2 | 1 | 1 | 2 | 1 | 2 | . | . |
|   | 2 | 1 | 1 | 2 | 2 | 2 | . | . |

$M_0$ (columns), $N_0$ (rows)

| j / i | 0 | 1 | 2 | 3 | 4 | . . . L-1 |
|---|---|---|---|---|---|---|
| 0 | 2/30 | 2/30 | 1/30 | 0 | 0 | . |
| 1 | 3/30 | 2/30 | 5/30 | 0 | 0 | . |
| 2 | 1/30 | 7/30 | 7/30 | 0 | 0 | . |
| 3 | 0 | 0 | 0 | 0 | 0 | . |
| 4 | 0 | 0 | 0 | 0 | 0 | . |
| ⋮ L-1 | | | | | | |

$\{(N_0 \times M_0) \text{ GLC MATRIX}\}$

FIG. 14

| i \ j | 0 | 1 | 2 | ... | L-1 | $\sum_{j=0}^{L-1} P(i,j|\Delta x, \Delta y)$ |
|---|---|---|---|---|---|---|
| 0 | 3/30 | 4/30 | 0 | | | 7/30 |
| 1 | 6/30 | 8/30 | 3/30 | | | 17/30 |
| 2 | 1/30 | 4/30 | 1/30 | | | 6/30 |
| ⋮ | | | | | | |
| L-1 | | | | | | |
| $\sum_{i=0}^{L-1} P(i,j|\Delta x, \Delta y)$ | 10/30 | 16/30 | | | | 4/30 |

$\{(N_1 \times M_3) \text{ GLC MATRIX}\}$ $u_i = \sum_{i=0}^{L-1} i \sum_{j=0}^{L-1} P(i,j|\Delta x, \Delta y) = 0 + 17/30 + (2 \times 6/30) = 29/30$ $u_j = \sum_{j=0}^{L-1} j \sum_{i=0}^{L-1} P(i,j|\Delta x, \Delta y) = 0 + 16/30 + (2 \times 4/30) = 24/30$ $u_i + u_j = 53/30 = 1.633$ $S(\Delta x, \Delta y) = \sum_{i=0}^{L-1} \sum_{j=0}^{L-1} (i+j-u_i-u_j)^3 (P(i,j|\Delta x, \Delta y)) = 0.111$

FIG. 15

$S(\Delta X, \Delta Y) = (0 + 0 - 1.767)^3 * 3/30 +$
$(0 + 1 - 1.767)^3 * 4/30 +$
$(0 + 2 - 1.767)^3 * 0 +$
$(1 + 0 - 1.767)^3 * 6/30 +$
$(1 + 1 - 1.767)^3 * 8/30 +$
$(1 + 2 - 1.767)^3 * 3/30 +$
$(2 + 0 - 1.767)^3 * 1/30 +$
$(2 + 1 - 1.767)^3 * 4/30 +$
$(2 + 2 - 1.767)^3 * 1/30 = 0.111$

FIG. 16

| i \ j | 0 | 1 | 2 | ... L-1 | $\sum_{j=0}^{L-1} P(i,j \mid \Delta x, \Delta y)$ |
|---|---|---|---|---|---|
| 0 | 0 | 2/30 | 1/30 | | 3/30 |
| 1 | 2/30 | 7/30 | 4/30 | | 13/30 |
| 2 | 1/30 | 4/30 | 9/30 | | 14/30 |
| ⋮ L-1 | | | | | |
| $\sum_{i=0}^{L-1} P(i,j \mid \Delta x, \Delta y)$ | 3/30 | 13/30 | 14/30 | | |

$$u_i = \sum_{i=0}^{L-1}\sum_{j=0}^{L-1} i\, P(i,j \mid \Delta x, \Delta y) = \{(N_1 \times M_1)\,\text{GLC MATRIX}\} = 0 + 13/30 + (2 \times 14/30) = 41/30$$

$$u_j = \sum_{j=0}^{L-1}\sum_{i=0}^{L-1} j\, P(i,j \mid \Delta x, \Delta y) = 0 + 13/30 + (2 \times 14/30) = 41/30$$

$$u_i + u_j = 82/30 = 2.733$$

$$S(\Delta x, \Delta y) = \sum_{i=0}^{L-1}\sum_{j=0}^{L-1} (i+j - u_i - u_j)^3 (P(i,j \mid \Delta x, \Delta y)) = -0.196$$

FIG. 17

$$\begin{aligned}
S(\Delta X, \Delta Y) = &\ (0 + 0 - 2.733)^3 * 0 + \\
&\ (0 + 1 - 2.733)^3 * 2/30 + \\
&\ (0 + 2 - 2.733)^3 * 1/30 + \\
&\ (1 + 0 - 2.733)^3 * 2/30 + \\
&\ (1 + 1 - 2.733)^3 * 7/30 + \\
&\ (1 + 2 - 2.733)^3 * 4/30 + \\
&\ (2 + 0 - 2.733)^3 * 1/30 + \\
&\ (2 + 1 - 2.733)^3 * 4/30 + \\
&\ (2 + 2 - 2.733)^3 * 9/30 = -0.196
\end{aligned}$$

FIG. 18

| i \ j | 0 | 1 | 2 | ... L-1 | $\sum_{j=0}^{L-1} P(i,j \mid \Delta x, \Delta y)$ |
|---|---|---|---|---|---|
| 0 | 3/30 | 1/30 | 0 | | 4/30 |
| 1 | 1/30 | 3/30 | 7/30 | | 11/30 |
| 2 | 0 | 6/30 | 8/30 | | 14/30 |
| ⋮ L-1 | | | | | |
| $\sum_{i=0}^{L-1} P(i,j \mid \Delta x, \Delta y)$ | 4/30 | 10/30 | 15/30 | | |

$\{(N_1 \times M_2) \text{ GLC MATRIX}\}$ $u_i = \sum_{i=0}^{L-1} i \sum_{j=0}^{L-1} P(i,j \mid \Delta x, \Delta y) = 0 + 11/30 + (2 \times 14/30) = 39/30$ $u_j = \sum_{j=0}^{L-1} j \sum_{i=0}^{L-1} P(i,j \mid \Delta x, \Delta y) = 0 + 10/30 + (2 \times 15/30) = 40/30$ $u_i + u_j = 79/30 = 2.633$ $S(\Delta x, \Delta y) = \sum_{i=0}^{L-1} \sum_{j=0}^{L-1} (i+j - u_i - u_j)^3 (P(i,j \mid \Delta x, \Delta y)) = -1.440$

*FIG. 19*

$S(\Delta X, \Delta Y) = (0 + 0 - 2.633)^3 * 3/30 +$
$(0 + 1 - 2.633)^3 * 1/30 +$
$(0 + 2 - 2.633)^3 * 0 +$
$(1 + 0 - 2.633)^3 * 1/30 +$
$(1 + 1 - 2.633)^3 * 3/30 +$
$(1 + 2 - 2.633)^3 * 7/30 +$
$(2 + 0 - 2.633)^3 * 0 +$
$(2 + 1 - 2.633)^3 * 6/30 +$
$(2 + 2 - 2.633)^3 * 8/30 = -1.440$

*FIG. 20*

| i \ j | 0 | 1 | 2 | . . . | L-1 | $\sum_{j=0}^{L-1} P(i,j \mid \Delta x, \Delta y)$ |
|---|---|---|---|---|---|---|
| 0 | 3/30 | 0 | 2/30 | | | 5/30 |
| 1 | 2/30 | 4/30 | 4/30 | | | 10/30 |
| 2 | 2/30 | 5/30 | 7/30 | | | 14/30 |
| ⋮ L-1 | | | | | | |
| $\sum_{i=0}^{L-1} P(i,j \mid \Delta x, \Delta y)$ | 7/30 | 9/30 | 13/30 | | | |

$\{(N_2 \times M_1) \text{ GLC MATRIX}\}$ $u_i = \sum_{i=0}^{L-1} i \sum_{j=0}^{L-1} P(i,j \mid \Delta x, \Delta y) = 0 + 10/30 + (2 \times 14/30) = 38/30$ $u_j = \sum_{j=0}^{L-1} j \sum_{i=0}^{L-1} P(i,j \mid \Delta x, \Delta y) = 0 + 9/30 + (2 \times 13/30) = 35/30$ $u_i + u_j = 73/30 = 2.433$ $S(\Delta x, \Delta y) = \sum_{i=0}^{L-1} \sum_{j=0}^{L-1} (i+j - u_i - u_j)^3 (P(i,j \mid \Delta x, \Delta y)) = -0.705$

FIG. 21

$S(\Delta X, \Delta Y) = (0 + 0 - 2.433)^3 * 3/30 +$ $(0 + 1 - 2.433)^3 * 0 +$ $(0 + 2 - 2.433)^3 * 2/30 +$ $(1 + 0 - 2.433)^3 * 2/30 +$ $(1 + 1 - 2.433)^3 * 4/30 +$ $(1 + 2 - 2.433)^3 * 4/30 +$ $(2 + 0 - 2.433)^3 * 2/30 +$ $(2 + 1 - 2.433)^3 * 5/30 +$ $(2 + 2 - 2.433)^3 * 7/30 = -0.705$

FIG. 22

| i \ j | 0 | 1 | 2 | ... | L-1 | $\sum_{j=0}^{L-1} P(i,j \mid \Delta x, \Delta y)$ |
|---|---|---|---|---|---|---|
| 0 | 2/30 | 4/30 | 1/30 | | | 7/30 |
| 1 | 3/30 | 6/30 | 5/30 | | | 14/30 |
| 2 | 1/30 | 5/30 | 3/30 | | | 9/30 |
| ⋮ | | | | | | |
| L-1 | | | | | | |
| $\sum_{i=0}^{L-1} P(i,j \mid \Delta x, \Delta y)$ | 6/30 | 15/30 | 9/30 | | | |

$\{(N_2 \times M_2) \text{ GLC MATRIX}\}$ $u_i = \sum_{i=0}^{L-1} i \sum_{j=0}^{L-1} P(i,j \mid \Delta x, \Delta y) = 0 + 14/30 + (2 \times 9/30) = 32/30$ $u_j = \sum_{j=0}^{L-1} j \sum_{i=0}^{L-1} P(i,j \mid \Delta x, \Delta y) = 0 + 15/30 + (2 \times 9/30) = 33/30$ $u_i + u_j = 65/30 = 2.167$ $S(\Delta x, \Delta y) = \sum_{i=0}^{L-1} \sum_{j=0}^{L-1} (i+j - u_i - u_j)^3 (P(i,j \mid \Delta x, \Delta y)) = -0.240$

FIG. 23

$$
\begin{aligned}
S(\Delta X, \Delta Y) = &(0 + 0 - 2.167)^3 * 2/30 + \\
&(0 + 1 - 2.167)^3 * 4/30 + \\
&(0 + 2 - 2.167)^3 * 1/30 + \\
&(1 + 0 - 2.167)^3 * 3/30 + \\
&(1 + 1 - 2.167)^3 * 6/30 + \\
&(1 + 2 - 2.167)^3 * 5/30 + \\
&(2 + 0 - 2.167)^3 * 1/30 + \\
&(2 + 1 - 2.167)^3 * 5/30 + \\
&(2 + 2 - 2.167)^3 * 3/30 = -0.240
\end{aligned}
$$

FIG. 24

| i \ j | 0 | 1 | 2 | . . . | L-1 | $\sum_{j=0}^{L-1} P(i,j \mid \Delta x, \Delta y)$ |
|---|---|---|---|---|---|---|
| 0 | 1/30 | 3/30 | 2/30 | | | 6/30 |
| 1 | 4/30 | 6/30 | 4/30 | | | 14/30 |
| 2 | 1/30 | 4/30 | 5/30 | | | 10/30 |
| ⋮ L-1 | | | | | | |
| $\sum_{i=0}^{L-1} P(i,j \mid \Delta x, \Delta y)$ | 6/30 | 13/30 | 11/30 | | | |

$\{(N_2 \times M_3) \text{ GLC MATRIX}\}$ $$u_i = \sum_{i=0}^{L-1} i \sum_{j=0}^{L-1} P(i,j \mid \Delta x, \Delta y) = 0 + 14/30 + (2 \times 10/30) = 34/30$$

$$u_j = \sum_{j=0}^{L-1} j \sum_{i=0}^{L-1} P(i,j \mid \Delta x, \Delta y) = 0 + 13/30 + (2 \times 11/30) = 35/30$$

$$u_i + u_j = 69/30 = 2.300$$

$$S(\Delta x, \Delta y) = \sum_{i=0}^{L-1} \sum_{j=0}^{L-1} (i+j - u_i - u_j)^3 (P(i,j \mid \Delta x, \Delta y)) = -0.016$$

*FIG. 25*

$$S(\Delta X, \Delta Y) = (0 + 0 - 2.300)^3 * 1/30 +$$
$$(0 + 1 - 2.300)^3 * 3/30 +$$
$$(0 + 2 - 2.300)^3 * 2/30 +$$
$$(1 + 0 - 2.300)^3 * 4/30 +$$
$$(1 + 1 - 2.300)^3 * 6/30 +$$
$$(1 + 2 - 2.300)^3 * 4/30 +$$
$$(2 + 0 - 2.300)^3 * 1/30 +$$
$$(2 + 1 - 2.300)^3 * 4/30 +$$
$$(2 + 2 - 2.300)^3 * 5/30 = -0.016$$

*FIG. 26*

| i \ j | 0 | 1 | 2 | ... | L-1 | $\sum_{j=0}^{L-1} P(i,j \mid \Delta x, \Delta y)$ |
|---|---|---|---|---|---|---|
| 0 | 2/30 | 0 | 0 | | | 2/30 |
| 1 | 4/30 | 4/30 | 5/30 | | | 13/30 |
| 2 | 1/30 | 8/30 | 6/30 | | | 15/30 |
| ⋮ | | | | | | |
| L-1 | | | | | | |
| $\sum_{i=0}^{L-1} P(i,j \mid \Delta x, \Delta y)$ | 7/30 | 12/30 | 11/30 | | | |

$\{(N_3 \times M_1) \text{ GLC MATRIX}\}$ $$u_i = \sum_{i=0}^{L-1} i \sum_{j=0}^{L-1} P(i,j \mid \Delta x, \Delta y) = 0 + 13/30 + (2 \times 15/30) = 43/30$$

$$u_j = \sum_{j=0}^{L-1} j \sum_{i=0}^{L-1} P(i,j \mid \Delta x, \Delta y) = 0 + 12/30 + (2 \times 11/30) = 33/30$$

$$u_i + u_j = 76/30 = 2.533$$

$$S(\Delta x, \Delta y) = \sum_{i=0}^{L-1} \sum_{j=0}^{L-1} (i+j - u_i - u_j)^3 (P(i,j \mid \Delta x, \Delta y)) = -0.914$$

FIG. 27

$$S(\Delta X, \Delta Y) = (0 + 0 - 2.533)^3 * 2/30 +$$
$$(0 + 1 - 2.533)^3 * 0 +$$
$$(0 + 2 - 2.533)^3 * 0 +$$
$$(1 + 0 - 2.533)^3 * 4/30 +$$
$$(1 + 1 - 2.533)^3 * 4/30 +$$
$$(1 + 2 - 2.533)^3 * 5/30 +$$
$$(2 + 0 - 2.533)^3 * 1/30 +$$
$$(2 + 1 - 2.533)^3 * 8/30 +$$
$$(2 + 2 - 2.533)^3 * 6/30 = -0.914$$

FIG. 28

| i \ j | 0 | 1 | 2 | ... | L-1 | $\sum_{j=0}^{L-1} P(i,j \mid \Delta x, \Delta y)$ |
|---|---|---|---|---|---|---|
| 0 | 0 | 6/30 | 1/30 | | | 7/30 |
| 1 | 6/30 | 5/30 | 4/30 | | | 15/30 |
| 2 | 1/30 | 3/30 | 4/30 | | | 8/30 |
| ⋮ | | | | | | |
| L-1 | | | | | | |
| $\sum_{i=0}^{L-1} P(i,j \mid \Delta x, \Delta y)$ | 7/30 | 14/30 | 9/30 | | | |

$\{(N_3 \times M_2) \text{ GLC MATRIX}\}$ $$u_i = \sum_{i=0}^{L-1} i \sum_{j=0}^{L-1} P(i,j \mid \Delta x, \Delta y) = 0 + 15/30 + (2 \times 8/30) = 31/30$$

$$u_j = \sum_{j=0}^{L-1} j \sum_{i=0}^{L-1} P(i,j \mid \Delta x, \Delta y) = 0 + 13/30 + (2 \times 9/30) = 32/30$$

$$u_i + u_j = 63/30 = 2.100$$

$$S(\Delta x, \Delta y) = \sum_{i=0}^{L-1} \sum_{j=0}^{L-1} (i+j - u_i - u_j)^3 (P(i,j \mid \Delta x, \Delta y)) = 0.552$$

FIG. 29

$$S(\Delta X, \Delta Y) = (0 + 0 - 2.100)^3 * 0 +$$
$$(0 + 1 - 2.100)^3 * 5/30 +$$
$$(0 + 2 - 2.100)^3 * 1/30 +$$
$$(1 + 0 - 2.100)^3 * 6/30 +$$
$$(1 + 1 - 2.100)^3 * 5/30 +$$
$$(1 + 2 - 2.100)^3 * 4/30 +$$
$$(2 + 0 - 2.100)^3 * 1/30 +$$
$$(2 + 1 - 2.100)^3 * 3/30 +$$
$$(2 + 2 - 2.100)^3 * 4/30 = 0.552$$

FIG. 30

| i \ j | 0 | 1 | 2 | . . . | L-1 | $\sum_{j=0}^{L-1} P(i,j \mid \Delta x, \Delta y)$ |
|---|---|---|---|---|---|---|
| 0 | 4/30 | 3/30 | 2/30 | | | 9/30 |
| 1 | 4/30 | 2/30 | 3/30 | | | 9/30 |
| 2 | 1/30 | 2/30 | 9/30 | | | 12/30 |
| ⋮ | | | | | | |
| L-1 | | | | | | |
| $\sum_{i=0}^{L-1} P(i,j \mid \Delta x, \Delta y)$ | 9/30 | 7/30 | 14/30 | | | |

$$\{(N_3 \times M_3) \text{ GLC MATRIX}\}$$

$$u_i = \sum_{i=0}^{L-1} i \sum_{j=0}^{L-1} P(i,j \mid \Delta x, \Delta y) = 0 + 9/30 + (2 \times 12/30) = 33/30$$

$$u_j = \sum_{j=0}^{L-1} j \sum_{i=0}^{L-1} P(i,j \mid \Delta x, \Delta y) = 0 + 7/30 + (2 \times 14/30) = 35/30$$

$$u_i + u_j = 68/30 = 2.267$$

$$S(\Delta x, \Delta y) = \sum_{i=0}^{L-1} \sum_{j=0}^{L-1} (i + j - u_i - u_j)^3 (P(i,j \mid \Delta x, \Delta y)) = -0.402$$

*FIG. 31*

$$S(\Delta X, \Delta Y) = (0 + 0 - 2.267)^3 * 4/30 +$$
$$(0 + 1 - 2.267)^3 * 3/30 +$$
$$(0 + 2 - 2.267)^3 * 2/30 +$$
$$(1 + 0 - 2.267)^3 * 4/30 +$$
$$(1 + 1 - 2.267)^3 * 2/30 +$$
$$(1 + 2 - 2.267)^3 * 3/30 +$$
$$(2 + 0 - 2.267)^3 * 1/30 +$$
$$(2 + 1 - 2.267)^3 * 2/30 +$$
$$(2 + 2 - 2.267)^3 * 9/30 = -0.402$$

*FIG. 32*

|  | $M_0$ | $M_1$ | $M_2$ | $M_3$ | $M_4$ | $M_a$ | $M_{a+1}$ |
|---|---|---|---|---|---|---|---|
| $N_0$ | -1.07 | 1.00 | 0.495 | -1.624 | 0.129 | -0.260 | 1.220 |
| $N_1$ | -1.01 | -0.196 | -1.440 | 0.111 | 0.792 | 0.216 | 0.712 |
| $N_2$ | -0.125 | -0.705 | 0.240 | -0.016 | -0.921 | 0.420 | 1.261 |
| $N_3$ | -0.215 | -0.914 | 0.552 | -0.402 | -0.320 | -0.112 | 1.011 |
| $N_4$ | -1.00 | -0.620 | 1.117 | 0.420 | 0.467 | 0.371 | -0.215 |
| $N_5$ | -0.216 | -0.216 | -0.321 | 0.614 | 0.321 | 0.425 | 0.621 |
| $N_b$ | 0.112 | 0.214 | 0.124 | 0.321 | +1.142 | -0.221 | -1.025 |
| $N_{b+1}$ | 0.001 | 0.111 | -0.100 | -0.120 | -1.250 | -0.214 | -0.012 |

FIG. 33

|  | $M_0$ | $M_1$ | $M_2$ | $M_3$ | $M_4$ | $M_a$ | $M_{a+1}$ |
|---|---|---|---|---|---|---|---|
| $N_0$ | 1 | 1 | 0 | 1 | 0 | 0 | 1 |
| $N_1$ | 1 | 0 | 0 | 0 | 0 | 0 | 1 |
| $N_2$ | 1 | 0 | 0 | 0 | 1 | 0 | 1 |
| $N_3$ | 1 | 0 | 1 | 0 | 0 | 0 | 1 |
| $N_4$ | 1 | 0 | 1 | 1 | 1 | 1 | 0 |
| $N_5$ | 1 | 1 | 0 | 1 | 1 | 1 | 0 |
| $N_b$ | 1 | 0 | 1 | 1 | 0 | 0 | 1 |
| $N_{b+1}$ | 1 | 1 | 0 | 0 | 1 | 1 | 1 |

FIG. 34

APPARATUS AND METHOD FOR CLOUD MASKING

BACKGROUND OF THE INVENTION

1. Field of the Invention

The presently disclosed invention relates to an apparatus and method for collecting satellite images of bodies of water such as the oceans and removing interfering clouds from the satellite images to improve the accuracy of the images. More particularly, the presently disclosed invention relates to the use of an apparatus and method to extract cloud edge information through local segmentation of the image and a procedure to discriminate between cloud free and cloud contaminated pixels. The cloud contaminated pixels are then removed from daytime and nighttime 1-km advanced very high resolution radiometer (AVHRR) satellite image.

1. Description of the Related Art

The quality of sea surface temperature (SST) measurements derived from spaceborn instruments depends largely on the accuracy of the cloud removal technique to eliminate cloud-contaminated pixels from the analysis. Clouds present a complicated problem. Generally, clouds are characterized by high albedos (i.e. the proportion of light or radiation reflected by a surface, especially of a planet or moon, for example, the whiteness of a reflection, The Concise Oxford Dictionary of Current English, Eighth Edition, R. E. Allen Ed., Clarendon Press, Oxford (1990)). In the daytime data collected, clouds have a greater whiteness or albedo than the surrounding non-cloud image. Clouds are also characterized by lower temperatures than the surrounding image. When clouds do not fill the instantaneous field of view (IFOV) of the instrument sensor, the cloud signatures become difficult to separate from the surrounding targets. Cirrus, low stratus and small cumulus are examples of clouds whose signatures can introduce large errors to the SST measurements.

Methods of cloud removal from satellite images vary from simple radiance thresholds to rather complicated procedures involving artificial intelligence techniques. Because a single technique does not appear to be sufficient in eliminating time and geographic dependency inherent within most techniques, the tendency is to combine a series of techniques. For instance, the operational cloud masking routine developed for the National Environmental Satellite Data and Information Service of the National Oceanic and Atmospheric Administration (NOAA NESDIS) uses a series of tests (i.e. gross cloud test, visible, thermal IR tests, and low stratus test) designed to eliminate different cloud signatures at several stages. The techniques implemented by the SeaSpace Corporation, San Diego, Calif. (SEA) remove clouds from AVHRR scenes based on a series of tests and thresholds similar to (but not the same as) those used by NOAA NESDIS. These latter procedures, which allow for further relaxation of the input parameter, produce less conservative (i.e. more cloud contaminated pixels are present in the satellite image) images than the NOAA NESDIS techniques. Simpson and Humphrey, infra methods rely on a combination of visible and infrared data, empirical albedo model as function of solar zenith angle, a radiance threshold, and sampling techniques across the image to insure that all Sun-pixel-satellite angles associated with that image are included in the calculations. See Simpson, J. J. and Humphrey, C., *An automated cloud screening algorithm for daytime advanced very high resolution radiometer imagery*, J. Geophys. Res., 95, 13, 459–13, 481 (1990), incorporated by reference herein in its entirety for all purposes. Although the methods may vary, standard cloud techniques rely on spectral rather than on texture signatures of the scene.

Ebert demonstrated that the introduction of pattern recognition techniques to AVHRR cloud removal methods produced cloud cover and cloud field structure information with great accuracy and less computation time than techniques that used spectral information exclusively. See Ebert, E., *A pattern recognition technique for distinguishing surface and cloud types in the polar regions*, J. Clin. Appl. Meteorol., 26, 1412–1427 (1987), incorporated by reference herein in its entirety for all purposes. Texture information alone extracted from a single visible channel was sufficient to detect, segment and classify different cloud types in polar regions. The gray level co-occurrence (GLC) matrix is one approach for extracting texture information of a scene based on the overall spatial relationship existing among its gray levels (i.e. intensity). See Haralick, R. M., Shanmugam, K., and Denstein, I., *Textural features for image classification*, IEEE Trans. Syst. Man Cybernt., 3, 610–621 (1973), incorporated by reference herein in its entirety for all purposes.

The Sea Surface Temperature Analysis and Composite (SSTAC) module is part of the Navy Tactical Environmental Support System (TESS) created to provide ships at sea with the capability to produce SST imagery from real-time 1-km-resolution AVHRR data. Currently, the module includes time efficient routines to identify and remove clouds from these data. Unfortunately, the daytime version of the cloud-masking technique is highly conservative. It overestimates cloud cover and removes a large number of cloud free pixels from each scene. The nighttime version of the algorithm, although less rigorous than the daytime version, produces noisy data sets and allows for a large number of cloud-contaminated pixels to enter the SST calculations. See Phegley, L. and Crosiar, C., *The third phase of TESS*, Bull. Am. Meteoroi. Soc., 72, 954–960 (1991), incorporated by reference herein in its entirety for all purposes. None of the techniques reviewed met the accuracy, time efficiency and geographical independence required for the production of accurate SST images.

Current methods of cloud identification and removal in satellite imagery of the oceans rely on spectral features of the scene exclusively. In some cases the methods are overly conservative and tend to remove large numbers of cloud free pixels. In other cases, the methods perform satisfactorily for very cold clouds with high albedo values but underestimate the low-level clouds whose temperature and albedos are similar to that of the ocean. Cirrus, low stratus and small cumulus are examples of such clouds. In addition, the current methods of cloud removal do not perform consistently over a wide range of latitudes and environmental conditions. In fact, they do not perform consistently within the same image. Accurate retrievals of oceanographic parameters such as the SST and ocean color depend largely on an accurate method of cloud removal. For a method of cloud detection to be useful it needs to be: (1) automated, (2) time efficient, (3) accurate, and (4) independent of geographic location and environmental conditions. Current methods of cloud detection do not meet these requirements.

SUMMARY OF THE INVENTION

It is therefore an object of the present invention to provide an apparatus and method for the retrieval of SST images from bodies of water such as the oceans and for the accurate removal of clouds from the retrieved SST images.

It is another object of the present invention to detect and remove cloud contaminated pixels from SST images automatically, time efficiently, accurately, and independent of geographic or environmental conditions.

It is another object of the present invention to detect and remove cloud contaminated pixels from daytime SST images automatically, time efficiently, accurately, and independent of geographic or environmental conditions.

It is another object of the present invention to detect and remove cloud contaminated pixels from nighttime SST images automatically, time efficiently, accurately, and independent of geographic or environmental conditions.

It is another object of the present invention to detect and remove cirrus, low stratus and small cumulus clouds whose signatures can introduce large errors into the SST measurements from SST images automatically, time efficiently, accurately, and independent of geographic or environmental conditions.

It is another object of the present invention to detect and remove cirrus, low stratus and small cumulus clouds whose signatures can introduce large errors into the SST measurements from daytime SST images automatically, time efficiently, accurately, and independent of geographic or environmental conditions.

It is another object of the present invention to detect and remove cirrus, low stratus and small cumulus clouds whose signatures can introduce large errors into the SST measurements from nighttime SST images automatically, time efficiently, accurately, and independent of geographic or environmental conditions.

It is another object of the present invention to provide an apparatus and method for the formation of a cloud mask from SST images of bodies of water such as the oceans.

It is another object of the present invention to detect and form a cloud mask of cloud contaminated pixels from SST images automatically, time efficiently, accurately, and independent of geographic or environmental conditions.

It is another object of the present invention to detect and form a cloud mask of cloud contaminated pixels from daytime SST images automatically, time efficiently, accurately, and independent of geographic or environmental conditions.

It is another object of the present invention to detect and form a cloud mask of cloud contaminated pixels from nighttime SST images automatically, time efficiently, accurately, and independent of geographic or environmental conditions.

It is another object of the present invention to detect and form a cloud mask of clouds such as cirrus, low stratus and small cumulus clouds whose signatures can introduce large errors into the SST measurements from SST images automatically, time efficiently, accurately, and independent of geographic or environmental conditions.

It is another object of the present invention to detect and form a cloud mask of clouds such as cirrus, low stratus and small cumulus clouds whose signatures can introduce large errors into the SST measurements from daytime SST images automatically, time efficiently, accurately, and independent of geographic or environmental conditions.

It is another object of the present invention to detect and form a cloud mask of clouds such as cirrus, low stratus and small cumulus clouds whose signatures can introduce large errors into the SST measurements from nighttime SST images automatically, time efficiently, accurately, and independent of geographic or environmental conditions.

These and other objects are accomplished by obtaining spectral information of the oceans using visible and infrared channels. Texture information is extracted from the visible and infrared (i.e. thermal channels) channels using the cluster shade texture measure. The cluster shade texture measure is utilized to determine edge pixels. The edge pixel determination is repeated until all edge identified pixels are joined to other edge identified pixels forming a boundary around contiguous nonedge pixel polygons having an outer shape defined by the edge pixel boundary. Having determined the shape of the contiguous nonedge pixel polygons and having identified the edge pixel boundary, for each polygon, the determination of whether the polygon is cloud free or cloud contaminated is made on the basis of the assumption that clouds are colder and brighter than the surrounding ocean. Polygons determined to be clouds are removed from the initial SST image to produce a nearly cloud free SST image. The step of removing polygons identified as clouds may be carried out at a later time. One may practice the presently disclosed invention by merely forming the cloud mask, according to the presently disclosed invention, for subsequent use by another party.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Color photographs of FIGS. 1–10 are incorporated by reference herein in their entirety for all purposes. To view the color photographs see the following article submitted with the attached information disclosure statement accompanying this application. See Gallegos, S. C., Hawkins, J. D., and Cheng, C. F., *A New Automated Method of Cloud Masking for Advanced Very High Resolution Radiometer Full-Resolution Data Over the Ocean*, Journal of Geophysical Research, Vol. 98, NO. C5 (1993), incorporated by reference herein in its entirety for all purposes.

Figure 11:
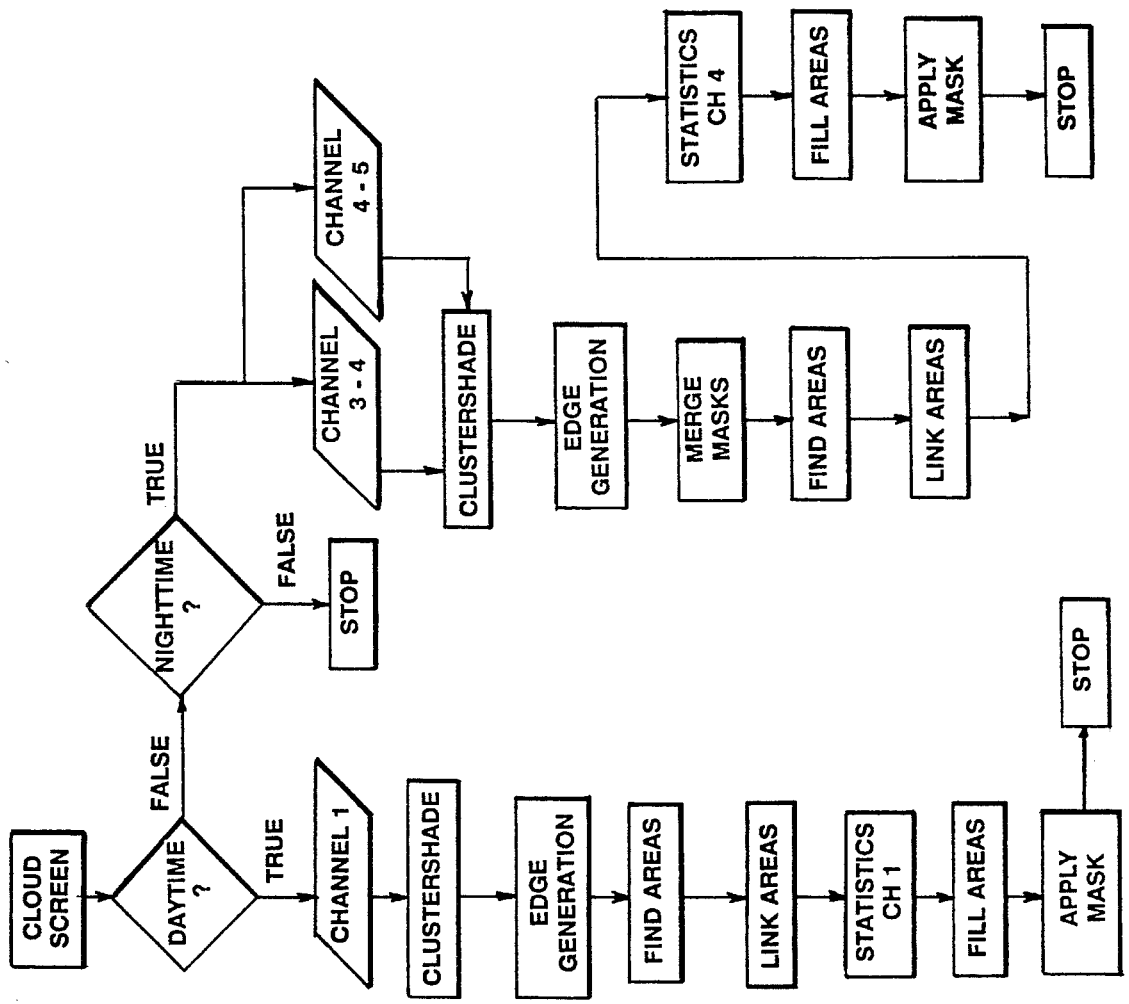

FIG. 11 depicts a flow chart of the various method steps for forming the cloud mask according to the presently disclosed invention.

Figure 12:
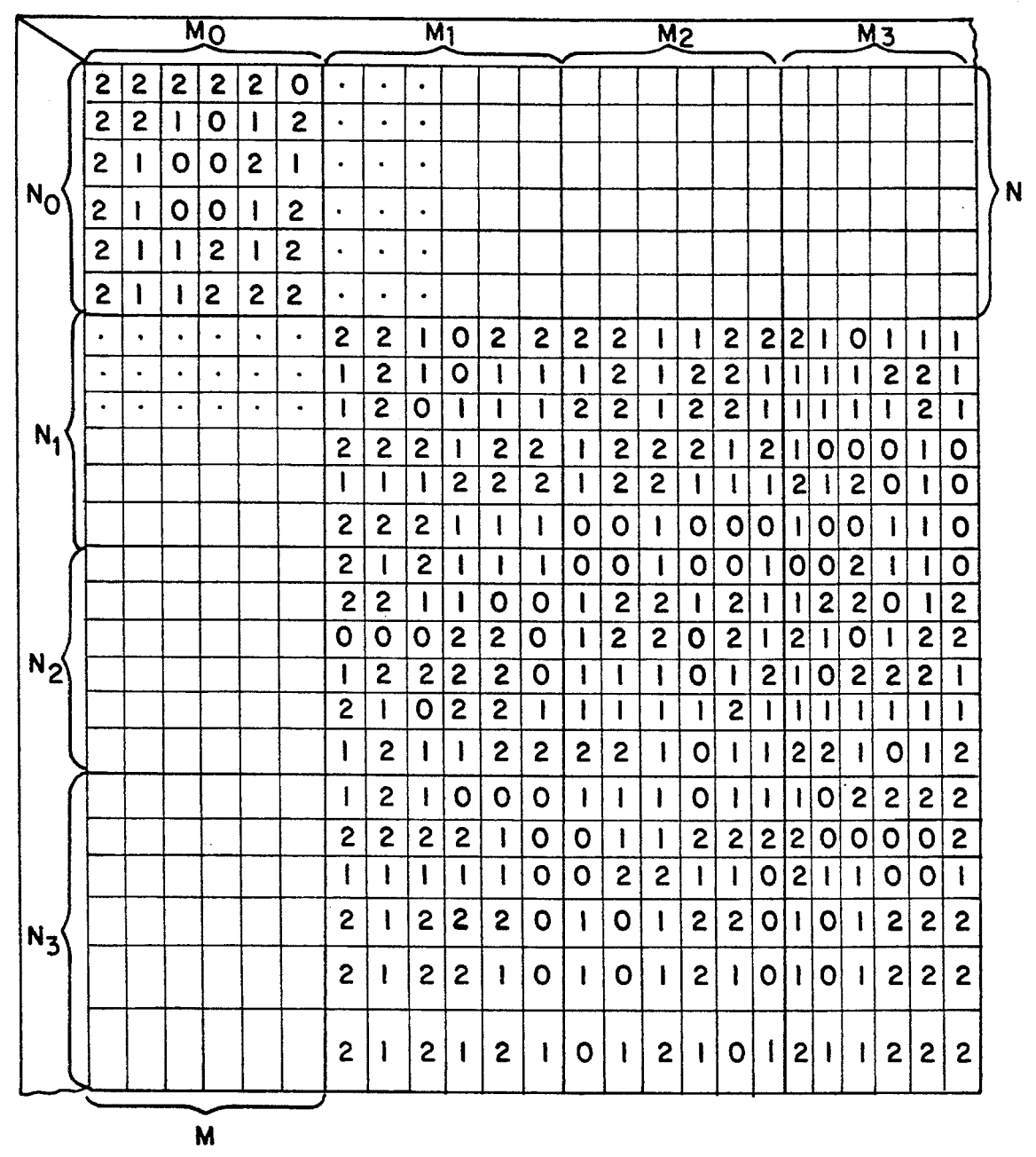

FIG. 12 is a schematic representation of an AVHRR scene with the intensity of the pixel indicated by a number from 0 to (L–1) at the spatial location of the pixel. The pixels are separated into local windows of size $N_0 \times M_0$, $N_0 \times M_1$, $N_0 \times M_2$, $N_0 \times M_3$, $N_1 \times M_0$, $N_1 \times M_1$, $N_1 \times M_2$, $N_1 \times M_3$, ... as indicated in FIG. 12 wherein the local size of each window is 6 pixels by 6 pixels, as an example. Further, adjacent local windows N×M are separated by a distance of Dx=6, or –6 and Dy=0, 6, or –6, as indicated in exemplary FIG. 12.

In FIG. 13, the cluster shade values calculated for each of the local windows or neighborhood of pixels identified as $N_1 \times M_1$, $N_1 \times M_2$, $N_1 \times M_3$, $N_2 \times M_1$, $N_2 \times M_2$, $N_2 \times M_3$, $N_3 \times M_1$, $N_3 \times M_2$, and $N_3 \times M_3$ in FIG. 12, are as indicated, respectively.

The GLC matrices for local windows $N_0 \times M_0$, $N_1 \times M_1$, $N_1 \times M_2$, $N_1 \times M_3$, $N_2 \times M_1$, $N_2 \times M_2$, $N_2 \times M_3$, $N_3 33 M_1$, $N_3 \times M_2$, and $N_3 \times M_3$ are calculated and shown in FIGS. 14, 17, 19, 15, 21, 23, 25, 27, 29 and 31, respectively.

For the exemplary local windows $N_1 \times M_1$, $N_1 \times M_2$, $N_1 \times M_3$, $N_2 \times M_1$, $N_2 \times M_2$, $N_2 \times M_3$, $N_3 \times M_1$, $N_3 \times M_2$, and $N_3 \times M_3$ of FIG. 12, the calculations of the cluster shade values, $S(\Delta x, \Delta y)$, are given in FIGS. 18, 20, 16, 22, 24, 26, 28, 30 and 32, respectively.

The necessary calculations of $u_i$ and $u_j$ for the exemplary local windows $N_1 \times M_1$, $N_{1 \times M2}$, $N_1 \times M_3$, $N_2 \times M_1$, $N_2 \times M_2$, $N_2 \times M_3$, $N_3 \times M_1$, $N_3 \times M_2$, and $N_3 \times M_3$ of FIG. 12, are given in FIGS. 17, 19, 15, 21, 23, 25, 27, 29 and 31, respectively.

An exemplary cluster shade texture measure image derived from FIG. 12 is depicted as previously indicated in FIG. 13. FIG. 13 has been incorporated into a larger exemplary cluster shade texture measure image in FIG. 33 wherein the respective cluster shade texture values are indicated.

Exemplary FIG. 34 depicts a binary file image corresponding to FIG. 33 wherein the 6×6 edge pixel windows are indicated with shading and with an intensity value of 0 and the nonedge pixel windows are indicated without shading and an intensity value of 1.

DESCRIPTION OF THE PREFERRED EMBODIMENTS

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive discovery.

Several terms and symbols are used in this application which have meaning as described below:

L=the number of intensity levels. In some of the examples that follow L=3. In obtaining FIGS. 5 and 8, L was set to equal 1024. L may vary from 0 to infinity. Typically L is between 0–100,000, inclusive. More typically, L is between 0–10,000, inclusive. Most typically L is between 0–5,000, inclusive. Preferably, L is between 0–2,500, inclusive. More preferably, L is from 800–1,500, inclusive. Most preferably, L is from 0–1024, inclusive.

N=the number of pixels (i.e. columns of pixels) in the local neighborhood. N is an integer between 2 to infinity. In some of the examples that follow N=6. Typically, N is an integer between 2–2,000, inclusive. More typically, N is an integer between 2–1,000, inclusive. Most typically, N is an integer between 2–500, inclusive. Preferably, N is an integer between 2–100, inclusive. More preferably, N is an integer between 2–6, inclusive. Most preferably, N is an integer between 3–6, inclusive.

M=the number of lines (i.e. rows of pixels) in the local neighborhood. M is an integer between 2 to infinity. In some of the examples that follow M=6. Typically, M is an integer between 2–2, 000, inclusive. More typically, M is an integer between 2–1,000, inclusive. Most typically, M is an integer between 2–500, inclusive. Preferably, M is an integer between 2–100, inclusive. More preferably, M is an integer between 2–6, inclusive. Most preferably, M is an integer between 3–6, inclusive. Note that both M and N cannot equal 2 at the same time.

Dx=the vertical distance between local neighborhoods of size N×M. Typically, overlapping local neighborhoods of size 1000×1000 wherein Dx=300 pixels and Dy=300 pixels may be used. More typically, overlapping local neighborhoods of size 500×500 wherein Dx=150 pixels and Dy=150 pixels may be used. Most typically, overlapping local neighborhoods of size 200×200 wherein Dx=60 pixels and Dy=60 pixels may be used. Preferably, overlapping local neighborhoods of size 100×100 wherein Dx=30 pixels and Dy=30 pixels may be used. More preferably, overlapping local neighborhoods of size 64×64 wherein Dx=1 pixel and Dy=1 pixels may be used. Most preferably, overlapping local neighborhoods of size 3×3 wherein Dx=1 pixel and Dy=1 pixel may be used.

$\Delta x$=the horizontal component of the displacement vector within each local neighborhood of size N×M used to compute cluster shade. Typically, $\Delta x$ is between 0–100, inclusive. More typically, $\Delta x$ is between 0–50, inclusive. Most typically, $\Delta x$ is between 0–25, inclusive. Preferably, $\Delta x$ is between 1–10, inclusive. More preferably, $\Delta x$ is between 1–5, inclusive. Most preferably, $\Delta x$ is 1.

$\Delta y$=the vertical component of the displacement vector within each local neighborhood of size N×M used to compute cluster shade. Typically, $\Delta y$ is between 0–100, inclusive. More typically, $\Delta y$ is between 0–50, inclusive. Most typically, $\Delta y$ is between 0–25, inclusive. Preferably, $\Delta y$ is between 0–10, inclusive. More preferably, $\Delta y$ is between 0–5, inclusive. Most preferably, $\Delta y$ is 1.

One kilometer AVHRR scenes are obtained using a conventional satellite data capturing techniques well known in the industry. See Kidwell, K. N., *Polar Orbiter data user's guide*, NOAA-NCDC, SDIS, U.S. Dept. of Commerce, Washington, D.C. (1983), incorporated by reference herein in its entirety for all purposes. See Holyer, R. J. and Peckinpaugh, S. H., *Edge detection applied to satellite imagery of the oceans*, IEEE Trans. Geosci. Remote Sens., 27, 46–56 (1989), incorporated by reference herein in its entirety for all purposes. See Parikh, J., *A comparative study of cloud classification techniques*, Remote Sens. Environ., 6, 67–81 (1977), incorporated by reference herein in its entirety for all purposes. See Welch, R. M., Sengupta, S. K., and Chen, D. W. *Cloud field classification based upon high spatial resolution textural features. 1. Gray level co-occurrence matrix approach*, J. Geophys. Res., 93, 12, 663-12, 681 (1988), incorporated by reference herein in its entirety for all purposes. See Welch, R. M., Sengupta, S. K., and Navar, M. S., *The effect of spatial resolution upon texture-based cloud field classifications*, J. Geophys. Res., 94, 14, 767–14, 781 (1989), incorporated by reference herein in its entirety for all purposes. See Welch, R. M., Sengupta, S. K., Goroch, K., Rabindra, P., Rangaraj, N. and Navar, M. S., *Polar cloud surface classification using AVHRR imagery: An intercomparison of methods*, J. Appl. Meteorol., 31, 405–419 (1992), incorporated by reference herein in its entirety for all purposes. A flow chart depicting the various method steps are presented in FIG. 11. Spectral information is derived from one visible and three infrared (IR) channels. These channels are channel 1 (585–685 nm), channel 3 (3,575–3,983 nm), channel 4 (10,362–11,299 nm) and channel 5 (11,450–12,424 nm). The first channel is utilized for resolving clouds during the day, and the last three channels are used for detecting clouds at night. The visible channels of the AVHRR instrument are customarily used to identify clouds in AVHRR scenes at various remote sensing facilities. Channel 2 provides high contrast between clouds and water. However, channel 1 was chosen because it appears to have better texture information than channel 2. At night, in the absence of reflective data, differences in thermal channel responses ((channel 3–channel 4) and (channel 4–channel 5)) are utilized. Spectral differences at these wavelengths ((channel 3–channel 4) and (channel 4–channel 5)) measure the opacity of the atmosphere.

Texture information is extracted from the visible (channel 1) and thermal channels ((channel 3–channel 4) and (channel 4–channel 5)) using the cluster shade texture measure, a local segmentation scheme based on the GLC matrix.

Initial steps in the resolution of cloud edges in a scene requires the computation of the GLC matrix. The (i, j)th element of the matrix is the relative frequency of occurrence of gray level i and gray level j when the ith gray level is separated by a distance or displacement vector ($\Delta x$, $\Delta y$) from the jth gray level within a window or local neighborhood of size M×N. Given a range of intensity levels or gray levels from 0 to (L–1), the GLC matrix is calculated from:

$$P(i,j|\Delta x, \Delta y) = \sum_{n=1}^{N-\Delta y} \sum_{m=1}^{M-\Delta x} A \qquad \text{EQUATION 1}$$

where $$A = \frac{1}{(M-\Delta x)(N-\Delta y)}$$

if f (m,n)=i and f(m+$\Delta x$, n+$\Delta y$)=j and

A=0 otherwise, f(m,n) is the intensity level of the pixel at sample (m, n), the ith gray level, and f(m+$\Delta x$, n+$\Delta y$) is the intensity of the pixel at sample (m+$\Delta x$, n+$\Delta y$), the jth gray level. FIG. 12 is a schematic representation of an AVHRR scene with the intensity of the pixel indicated by a number from 0 to (L–1) at the spatial location of the pixel. The pixels are separated into local windows of size $N_0 \times M_0$, $N_0 \times M_1$, $N_0 \times M_2$, $N_0 \times M_3$, $N_1 \times M_0$, $N_1 \times M_1$, $N_1 \times M_2$, $N_1 \times M_3$, ... as indicated in FIG. 12 wherein the local size of each window is 6 pixels by 6 pixels, as an example. Further, adjacent local windows N×M are separated by a distance of Dx=6, or –6 and Dy=0, 6, or –6, as indicated in exemplary FIG. 12. As an example, the GLC matrices for local windows $N_0 \times M_0$, $N_1 \times M_1$, $N_1 \times M_2$, $N_1 \times M_3$, $N_2 \times M_1$, $N_2 \times M_2$, $N_2 \times M_3$, $N_3 \times M_1$, $N_3 \times M_2$, and $N_3 \times M_3$ are calculated and shown in FIGS. 14, 17, 19, 15, 21, 23, 25, 27, 29 and 31, respectively.

Figure 1:
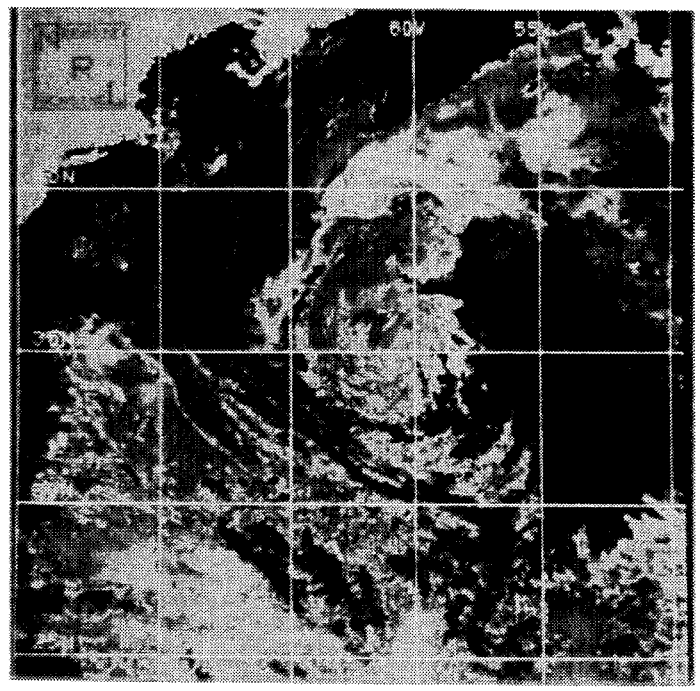
FIG. 1 (plate 1) is a daytime AVHRR SST scene of the waters of the east coast of the United States acquired on Apr. 15, 1987. Clouds, shown as black pixels, are removed from the image using constant radiance threshold (CRT) methods computed from visible and infrared data. For comparison this photograph is representative of the daytime photograph having used CRT methods.
Figure 2:
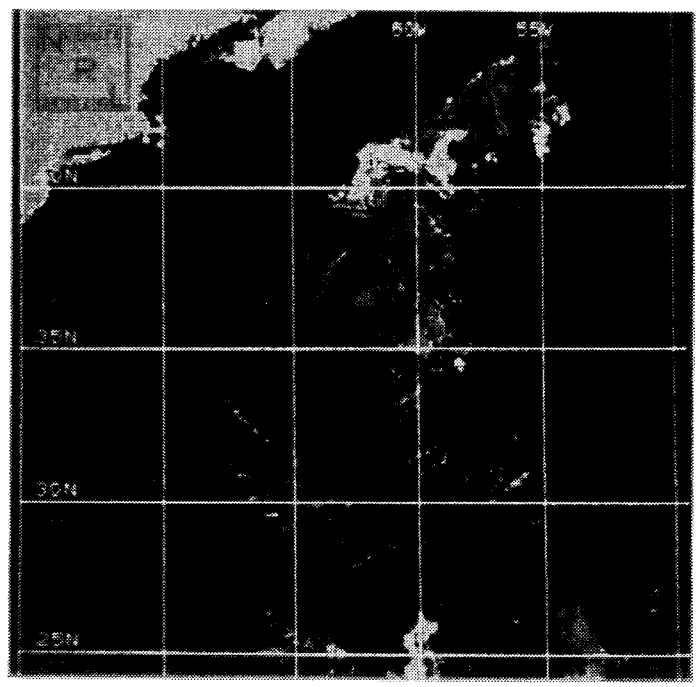
FIG. 2 (plate 2) is a daytime AVHRR SST scene of the waters of the east coast of the United States acquired on Apr. 15, 1987. Clouds, shown as black pixels, are removed from the image using the SeaSpace routines. For comparison this photograph is representative of the daytime photograph having used the SeaSpace routines.
Figure 3:
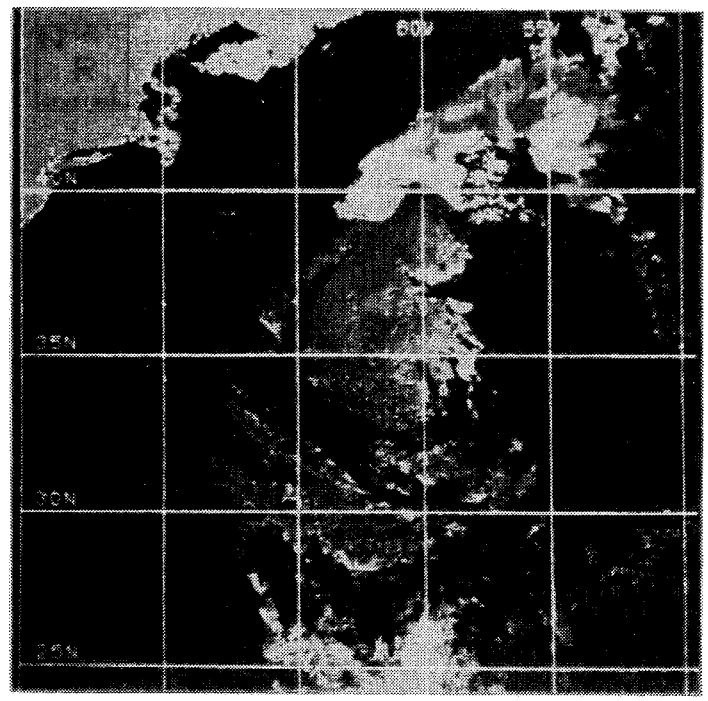
FIG. 3 (plate 3) is a daytime AVHRR SST scene of the waters of the east coast of the United States acquired on Apr. 15, 1987. Clouds, shown as black pixels, are removed from the image using the Simpson and Humphrey routines. For comparison this photograph is representative of the daytime photograph having used the Simpson and Humphrey routines.
Figure 4:
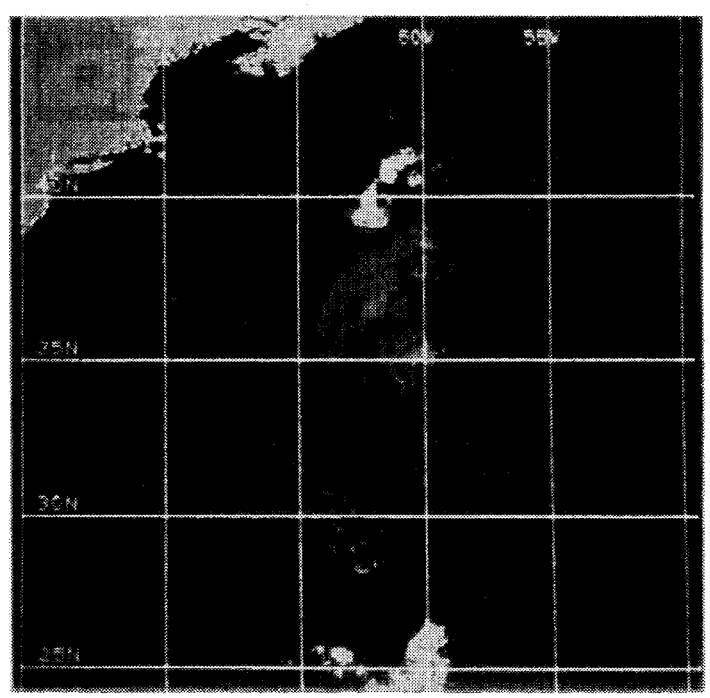
FIG. 4 (plate 4) is a daytime AVHRR SST scene of the waters of the east coast of the United States acquired on Apr. 15, 1987. Clouds, shown as black pixels, are removed from the image using the NOAA NESDIS techniques. For comparison this photograph is representative of the daytime photograph having used the NOAA NESDIS routines.
Figure 5:
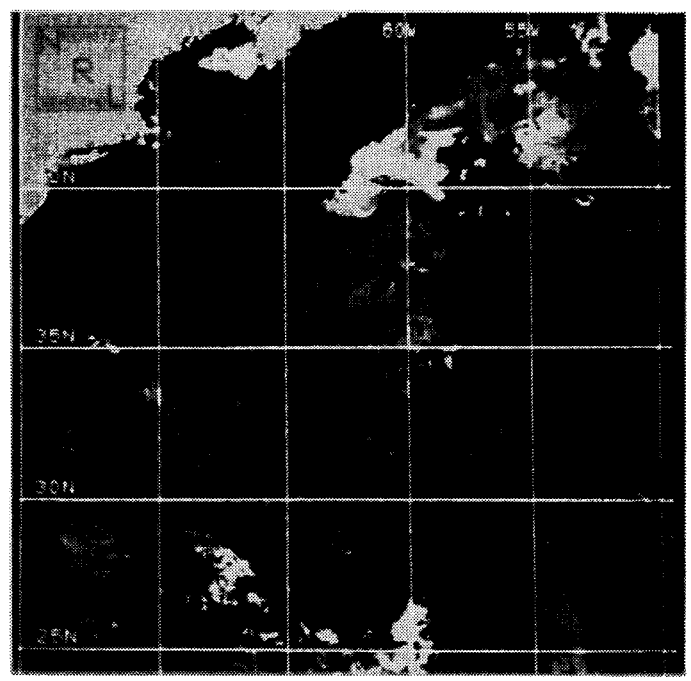
FIG. 5 (plate 5) is a daytime AVHRR SST scene of the waters of the east coast of the United States acquired on Apr. 15, 1987. Clouds, shown as black pixels, are removed from the image using the apparatus and method of the currently disclosed invention (the NRL-SSC cloud masking technique). For comparison this photograph is representative of the daytime photograph having used the NRL-SSC apparatus and routines of the presently disclosed invention.
Figure 6:
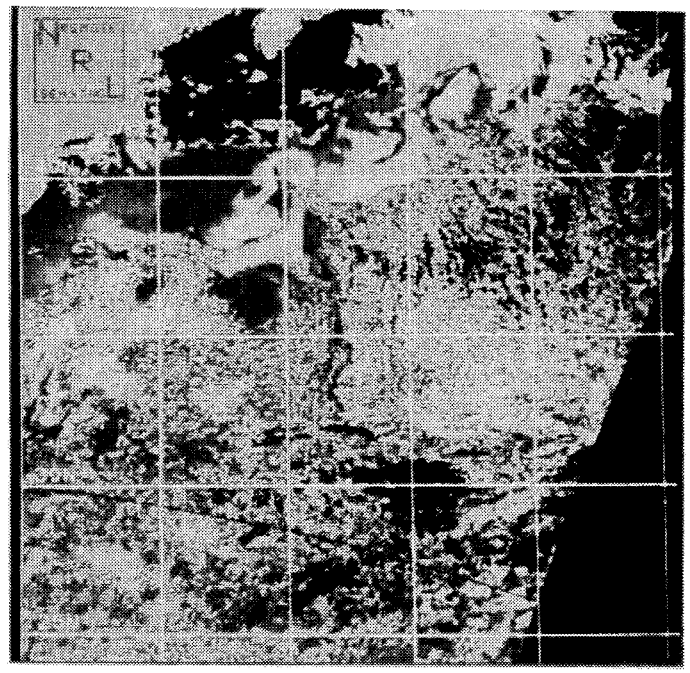
FIG. 6 (plate 6) is a nighttime AVHRR SST scene of the waters of the east coast of the United States acquired on Apr. 10, 1989. Clouds, shown as black pixels, are removed from the image using constant radiance threshold (CRT) methods computed from visible and infrared data. For comparison this photograph is representative of the nighttime photograph having used CRT methods.
Figure 7:
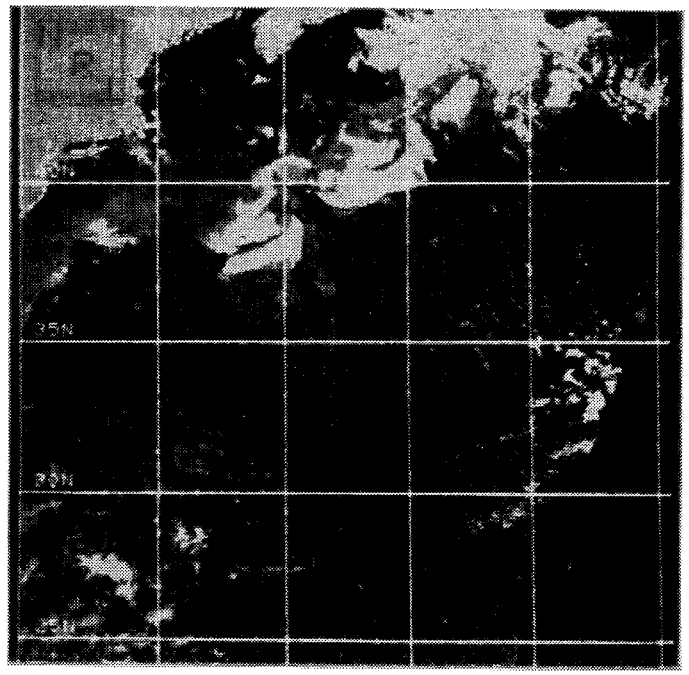
FIG. 7 is a nighttime AVHRR SST scene of the waters of the east coast of the United States acquired on Apr. 10, 1989. Clouds, shown as black pixels, are removed from the image using the NOAA NESDIS routines. For comparison this photograph is representative of the nighttime photograph having used the NOAA NESDIS nighttime routines.
Figure 8:
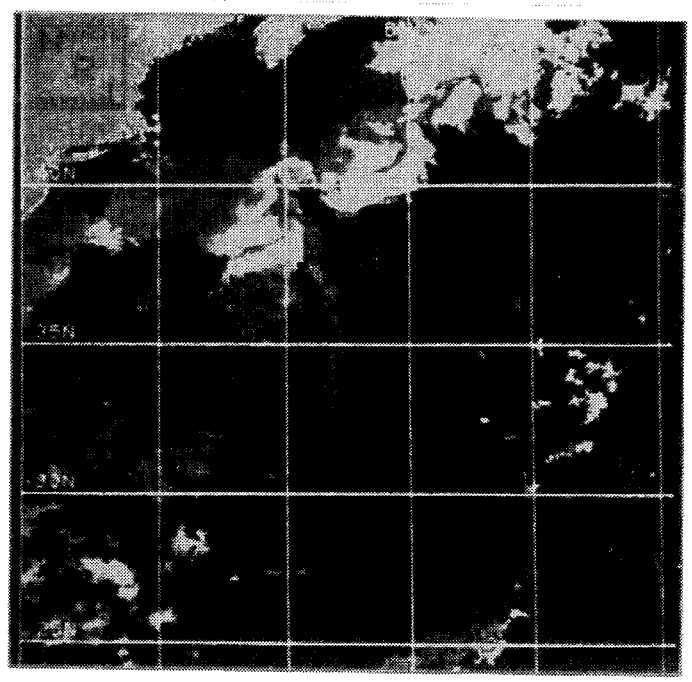
FIG. 8 is a nighttime AVHRR SST scene of the waters of the east coast of the United States acquired on Apr. 10, 1989. Clouds, shown as black pixels, are removed from the image using the apparatus and method of the present invention (the NRL-SSC routines). For comparison this photograph is representative of the nighttime photograph having used the NRL-SSC apparatus and methods of the presently disclosed invention.
Figure 9:
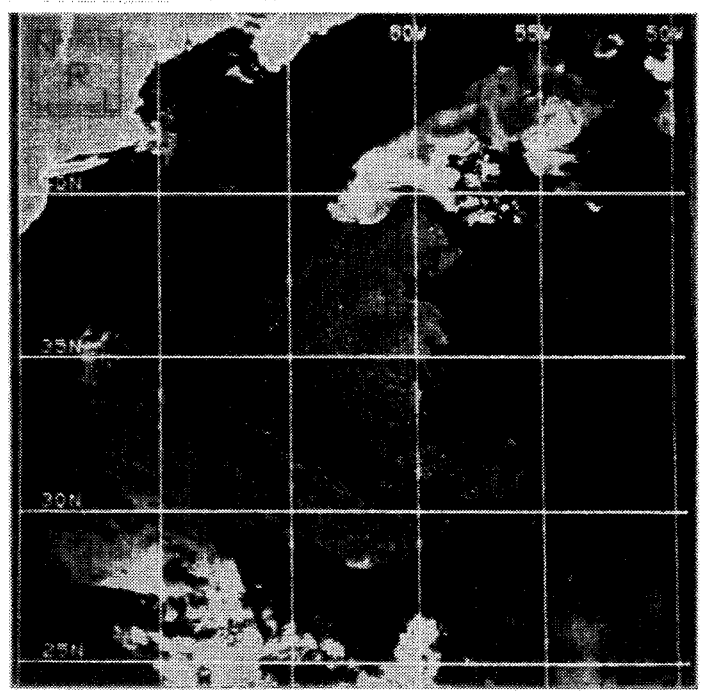
FIG. 9 is a daytime AVHRR SST scene of the waters of the east coast of the United States acquired on Apr. 15, 1987. Clouds, shown as black pixels, are removed from the image using a mask produced through local thresholds and general human interpretation. For comparison this photograph is representative of the daytime photograph using general human interpretation.
Figure 10:
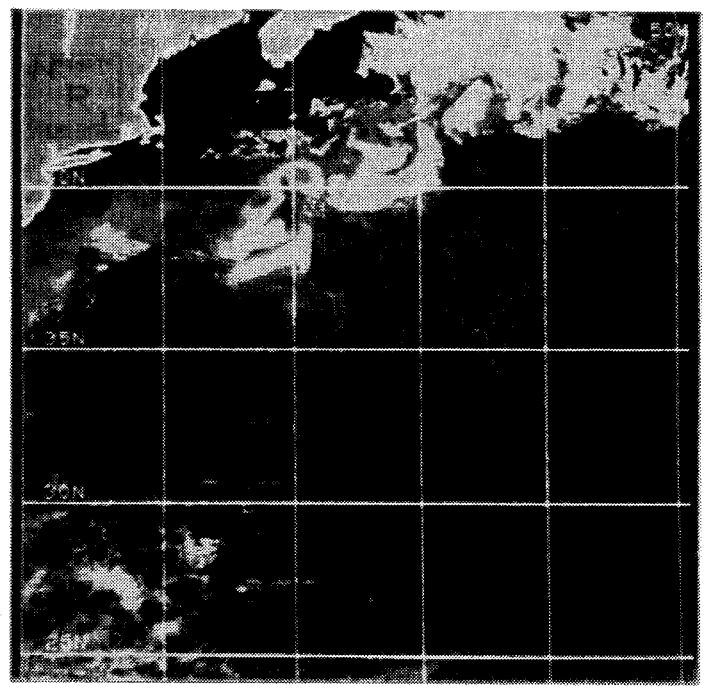
FIG. 10 is a nighttime AVHRR SST scene of the waters of the east coast of the United States acquired on Apr. 10, 1989. Clouds, shown as black pixels, are removed from the image using a mask produced through local thresholds and general human interpretation. The apparatus and method of the currently disclosed invention (the NRL-SSC cloud masking technique). For comparison this photograph is representative of the nighttime photograph using general human interpretation.

FIGS. 5 and 8 were obtained wherein the local windows were of size N×M=3×3 and wherein local windows were separated by a distance Dx=1, or –1 and Dy=1 or –1. Thus, while the exemplary local windows $N_0 \times M_0$, $N_0 \times M_1$, $N_0 \times M_2$, $N_0 \times M_3$, $N_1 \times M_0$, $N_1 \times M_1$, $N_1 \times M_2$, $N_1 \times M_3$, ... in FIG. 12 do not overlap, local windows used to obtain FIGS. 5 and 8 did overlap. The small window size and displacement vectors used in obtaining FIGS. 5 and 8 were geared towards detecting changes in intensity occurring over small distances in the AVHRR scene. The small window size and small displacement vectors are preferred for locating small clouds and small cloud fringes. As is apparent from FIGS. 14, 17, 19, 15, 21, 23, 25, 27, 29 and 31, the GLC matrix computations result in a second-order probability matrix of size L×L from which cluster shade, a measure of the local variation in intensity between pixels, is calculated for each local neighborhood N×M according to the formula:

$$S(\Delta x, \Delta y) = \sum_{i=0}^{L-1} \sum_{j=0}^{L-1} (i+j-u_i-u_j)^3 P(i,j|\Delta x, \Delta y) \qquad \text{EQUATION 2}$$

where $u_i$ and $u_j$ are estimates of mean intensity calculated from the weighted summations of rows and columns of the GLC matrix, according to the formulas:

$$u_i = \sum_{i=0}^{L-1} i \sum_{j=0}^{L-1} P(i,j|\Delta x, \Delta y) \qquad \text{EQUATION 3}$$

$$u_j = \sum_{j=0}^{L-1} j \sum_{i=0}^{L-1} P(i,j|\Delta x, \Delta y) \qquad \text{EQUATION 4}$$

For the exemplary local windows $N_1 \times M_1$, $N_1 \times M_2$, $N_1 \times M_3$, $N_2 \times M_1$, $N_2 \times M_2$, $N_2 \times M_3$, $N_3 \times M_1$, $N_3 \times M_2$, and $N_3 \times M_3$ of FIG. 12, the calculations of the cluster shade values, S ($\Delta x$, $\Delta y$), are given in FIGS. 18, 20, 16, 22, 24, 26, 28, 30 and 32, respectively. The necessary calculations of $u_i$ and $u_j$ for the exemplary local windows $N_1 \times M_1$, $N_1 \times M_2$, $N_1 \times M_3$, $N_2 \times M_1$, $N_2 \times M_2$, $N_2 \times M_3$, $N_3 \times M_1$, $N_3 \times M_2$, and $N_3 \times M_3$ of FIG. 12, are given in FIGS. 17, 19, 15, 21, 23, 25, 27, 29 and 31, respectively.

From the computation of the cluster shade values, a new image is produced in which the center pixel of each local neighborhood (i.e. note that a local neighborhood N×M wherein N=M=an odd integer, a center pixel is readily identified whereas if N=M=an even integer, then one must choose one of four pixels to consistently to be the center pixel) is replaced with a cluster shade value calculated for that neighborhood. Thus, in exemplary FIG. 13, the cluster shade values calculated for each of the local windows or neighborhood of pixels identified as $N_1 \times M_1$, $N_1 \times M_2$, $N_1 \times M_3$, $N_2 \times M_1$, $N_2 \times M_2$, $N_2 \times M_3$, $N_3 \times M_1$, $N_3 33\ M_2$, and $N_3 \times M_3$ in FIG. 12, are as indicated, respectively. The calculated cluster shade values are utilized to generate edges using the zero-crossing test.

With an exemplary local neighborhood size of 3×3 and Dx=1 and Dy=1, each pixel is the center of a given local overlapping neighborhood. After calculation of the cluster shade values, as indicated by EQUATION 2 above, for the entire AVHRR scene, each pixel now has associated with it a calculated cluster shade value, $S(\Delta x, \Delta y)$. Due to the overlapping of local neighborhoods of size 3×3, and Dx=1 and Dy=1 between local neighborhoods, each pixel of the AVHRR scene has a computed cluster shade value associated with a given pixel. The entire set of cluster shade values forms a cluster shade texture image.

Edges are generated by a zero crossing test. Edges are generated at the site of the neighboring pixels whose cluster shade values are opposite in sign (zero crossing) and where both have cluster shade intensities greater than or equal to a chosen threshold. To avoid producing edges for noncloud targets, thresholds are introduced. The daytime version uses an exemplary cluster shade threshold of 3, and the nighttime version uses a threshold of 100.

The zero crossing test is implemented as follows. The user selects an initial threshold to be used for this test. Each exemplary 3×3 overlapping neighborhood of the computed cluster shade texture image is tested as follows. If the center pixel of the 3×3 overlapping neighborhood has an absolute cluster shade value≧the initial threshold value, then the 8 pixel neighbors of the center pixel (i.e. in a 3×3 neighborhood) are tested as follows. If any of the 8 neighbors have an absolute cluster shade value≧the initial threshold and have an opposite sign from the center pixel cluster shade value, then that center pixel is considered an edge pixel. Although most of the edges (i.e. pixels identified as edges using the zero crossing test described above) are in place after conducting the zero crossing test for each pixel one time, some of the pixels are determined to be edges forming isolated strings (i.e. the pixels defined as edges that do not form closed polygons). Since clouds occupy a finite space, individual clouds are defined by an outer edge boundary taking the shape of a polygon. Since some of the polygons defined by the edge pixels represent clouds, it is necessary to enable the isolated strings (i.e. a series of adjacent edge pixels, the ends of which are adjacent to nonedge pixels) to join with other strings to form polygons, by extending the original edge strings using a procedure similar to the one utilized in the first zero crossing test.

The extended zero crossing test is optional. This extension computation is used to extend edges detected in the first zero crossing test. The parameters involved are a second or minimum threshold and maximum allowed passes through the cluster shade texture measure image.

Thus, an extended zero erossing test (extension computation) is performed. New thresholds are set. An exemplary daytime threshold is 1 and an exemplary nighttime threshold is 40. For the edge extension computation to be successful, the exemplary 3×3 local neighborhoods of nonedge pixels are examined. For an exemplary local 3×3 window or neighborhood to enter the edge extension computations, the cluster shade value of the center pixel must be greater than the new threshold and one of the exemplary 9 pixel members of the exemplary 3×3 local window must have been defined as an edge in the previous zero crossing test. New edge pixels are generated at the site of those pixels whose cluster shade value is greater than and opposite in sign to the new threshold. While the extended zero crossing test may be repeated 0, 1, 2, 3, 4, 5, 6, 7, 8, 9, 10, 11, 12, 13, 14, 15, 16, 17, 18, 19, 20, or more times, the extended zero crossing test is exemplarily repeated 17 times, after which most of the connections have been established. Further runs of the extended zero crossing test (greater than 17) only increases processing time and yields very few additional connections.

After the zero crossing test and the extended zero crossing test are performed on the cluster shade texture measure image, edge pixels are identified as described above. Edge pixels are assigned a zero value, and nonedge pixels are set to 1. Areas of polygons in the context of overlapping 3×3 local windows are clusters of contiguous nonedge pixels (intensity=1) which are surrounded by one-pixel-wide boundaries of edge pixels (intensity=0). Thus, a binary file is generated wherein edges are represented by 0s and the polygons within the edges are represented by 1s.

An exemplary cluster shade texture measure image derived from FIG. 12 is depicted as previously indicated in FIG. 13. FIG. 13 has been incorporated into a larger exemplary cluster shade texture measure image in FIG. 33 wherein the respective cluster shade texture values are indicated. In exemplary FIG. 33, 6×6 nonoverlapping neighborhoods are subjected to the zero crossing test once. An exemplary threshold of 0.100 was used. After one pass of the zero crossing test, those 6×6 windows identified as edges are indicated by an X in the local window and a darker shade. Note that because 6×6 nonoverlapping windows were tested, the nonedge pixels are identified by 6 or more pixel wide boundaries of edge pixels. Exemplary FIG. 34 depicts a binary file image corresponding to FIG. 33 wherein the 6×6 edge pixel windows are indicated with shading and an intensity value of 0 and the nonedge pixel windows are indicated without shading and an intensity value of 1.

Areas in the AVHRR scene that fail to produce edges occur in homogeneous regions associated with cloud free oceanic areas or with the tops of very cold clouds. Heterogeneous regions, which produce large numbers of edges are found at the interphase of the clouds and the ocean, and also between cloud layers. Because the edge information produced in the binary file image was not sufficient to permit discrimination of cloud masses (i.e. tops of very cold clouds, the interphase of clouds and the ocean, and between cloud layers), an additional routine designed to separate cloudy from clear areas in the AVHRR scene was implemented. This additional routine automatically searches, identifies and labels areas or polygons generated in the binary files as clouds or as ocean. Areas identified as clouds become part of a cloud mask.

Each line of data from the binary files is scanned to search for strings of contiguous nonedge pixels (i.e. strings of 1s).

Note that nonedge strings are being scanned. Upon encountering the beginning of a nonedge string, the algorithm first assigns the nonedge string a unique exemplary 16-bit identification number and then sets out to find links between that string and neighboring strings. The linkage information is stored in an exemplary 16-bit pointer array. When two nonedge strings connect, the resulting nonedge string takes on the lower of the two identification numbers. The process of searching for nonedge strings and linking them continues until all possible connections have been established and the nonedge strings are clustered into labeled polygons.

A given image can contain from a few polygons to thousands of polygons. To reduce the number of polygons, and thereby reduce processing time for the scene, the smaller polygons are eliminated from further calculations by assimilating them into the cloud mask (i.e. similar to a template that displays where all the clouds are located within the AVHRR scene). The criterion used for this elimination is that if the total number of pixels within the polygon is smaller than the total number of edge pixels enclosing it, the polygon is considered to be cloud noise. Thus, for example, 6×6 pixel window $N_2 \times M_4$ of FIG. 34 would be assimilated into the cloud mask.

The larger remaining polygons are separated on the basis of the assumption that clouds are colder and brighter than the surrounding ocean. Mean calibrated albedos (channel 1 daytime pixel intensity data is used) or brightness temperatures (channel 4 nighttime pixel intensity—temperature—data is used) are calculated for each polygon and its boundary. The albedos are calculated from channel 1 data and the brightness temperatures are calculated from channel 4 data.

A cloud free polygon should have a lower mean albedo than that of the edge boundary or a higher mean brightness temperature than that of the edge boundary. This assumption holds because clouds are more white (higher albedo) and colder (lower temperature) than the oceans below. Thus, the opposite is true for a cloud filled polygon. A polygon that has been declared to be cloud filled by these procedures is assimilated into the cloud mask and all of its pixels are set to 0. Pixels in a cloud free polygon are set to 1.

By applying the aforementioned steps, a procedure is designed to produce a refined binary image identifying regions of clouds and regions of cloud free areas. The regions of clouds identified form a cloud mask. The cloud mask is used to remove SST data corresponding to the spatial location within an AVHRR image that is occupied by a cloud as determined by the cloud mask.

Note that according to the flowchart of FIG. 11, channel 1 albedo data is used to form a GLC matrix (not shown). The GLC matrix is used to form a cluster shade texture measure image (clustershade). The cluster shade texture measure image is subjected to zero crossing tests to generate edge pixels (edge generation). Nonedge pixels are located and linked to form polygons (find areas and link areas). The polygons are subjected to mean albedo comparison with the mean albedo of the edge boundary. If a polygon has a higher mean albedo than the mean albedo of the edge boundary, the polygon is determined to be a cloud (statistics). If the polygon is determined to be a cloud, the polygon is filled with 0s (fill areas). After all the polygons have been subjected to statistics, all cloud polygons are combined to form a cloud mask. When SST AVHRR data spatially corresponds to the same location as a cloud (i.e. occupying the same space as indicated by the cloud mask), the SST AVHRR data is discarded and is depicted as the black cloud region as indicated in FIG. 5 (apply mask).

Note that according to the flowchart of FIG. 11, opacity data obtained at nighttime by the subtraction of (channel 3–channel 4 data) and (channel 4–channel 5 data) is utilized individually to form a GLC matrix (not shown) for each of (channel 3–channel 4 data) and (channel 4–channel 5 data). A cluster shade texture measure image is formed for each of (channel 3–channel 4 data) and (channel 4–channel 5 data) (i.e. clustershade). The cluster shade texture measure image for each of (channel 3–channel 4 data) and (channel 4–channel 5 data) is subjected to zero crossing tests to generate edge pixels (edge generation). The two edge generated matrices from each of (channel 3–channel 4 data) and (channel 4–channel 5 data) are combined to form a single matrix defining generated edge pixels (merge masks). Thereafter, the nonedge pixels are located and linked to form polygons (find areas and link areas). The polygons of nonedge pixels are subjected to mean temperature comparison with the mean temperature of the edge boundary. If a polygon has a lower mean temperature than the mean temperature of the edge boundary, the polygon is determined to be a cloud (statistics). If the polygon is determined to be a cloud the polygon is filled with 0s (fill areas). After all the polygons have been subjected to statistics, all cloud polygons are combined to form a cloud mask. When SST AVHRR data spatially corresponds to the same location as a cloud (i.e. occupying the same space as indicated by the cloud mask), the SST AVHRR data is discarded and is depicted as the black cloud region as indicated in FIG. 8 (apply mask).

Having described the invention, the following examples are given to illustrate specific applications of the invention, including the best mode now known to perform the invention. These specific examples are not intended to limit the scope of the invention described in this application.

EXAMPLES

Example 1

The NRL-SSC algorithm was designed to be an operational procedure for shipboard use, and as such, its development was governed by three requirements: accuracy, geographical independence, and time efficiency. The extent to which this algorithm met the first two requirements is demonstrated in the examples below. The time efficiency factor was assessed via CPU times for each run. Two systems were used for this purpose: A VAX/8800 and a CONCURRENT/5450. The first system was chosen because it is widely used and can give the reader a frame of reference, and the second system is an early version of the TESS computer installed on board Navy ships. In both systems, the CPU time was less than 55 seconds for the daytime algorithm and less than 2 minutes for the nighttime algorithm.

The AVHRR image collections were performed following recommendations by the National Environmental Satellite Data and Information Service of the National Oceanic and Atmospheric Administration (NOAA/NESDIS). See Kidwell, K. N., (1983), supra.

The actual code of the NRL-SSC algorithm in FORTRAN used is given on the following pages.

Example 2

Evaluation of the capabilities of this technique to detect clouds from AVHRR data was accomplished through comparisons of the NRL-SSC algorithm with cloud mask results of (1) other experimental and operational cloud removal techniques and (2) human interpretation of images of the cloud cover at the time of the satellite pass. These evaluations were performed with 1-km full-resolution AVHRR data.

Both daytime and nighttime evaluations were accomplished in the same area of the central and north Atlantic, from 24.18° N to 45.00° N and from 49.42° W to 75.00° W. This area was chosen because of availability of data and for its wide range of atmospheric and oceanographic gradients. Both the daytime and nighttime sets include cold water regimes in the higher latitudes and warm water in the lower latitudes. There is also a variety of cloud types, ranging from cold cloud masses to the thin warmer clouds of the lower latitudes.

The daytime evaluation uses data from 15 Apr. 1987 and five cloud masks: CRT, SEA, S&H, NOAA and NRL-SSC. Scenes containing cloud masks from these five techniques appear in FIGS. 1–5, respectively.

These scenes as well as the nighttime scenes (FIGS. 6–10) were processed with a color table in which colder waters are depicted by beige, yellow and red hues while warmer waters are shown as greens and blues. This color assignment is opposite to normal convention and was chosen for no other reason than to show contrast between cloud edges and the surrounding ocean. Clouds identified by the individual cloud removal techniques are shown as black. Pixels that are cloud contaminated but that failed to be included in a given cloud mask appear as scattered yellow and red regions around the black cloud masses. Cloud contaminated pixels, as defined here, are pixels that exhibit anomalous radiances in reference to the surrounding pixels. These occur in the fringes of the large cloud masses and in the form of isolated patches over the more homogeneous ocean.

Example 3

The CRT mask (FIG. 1) is a cloud mask produced by constant radiance thresholds (CRT). In this procedure clouds are removed from the scene by choosing arbitrary threshold values in the visible and infrared data. One drawback of this method is that it changes from image to image and depending on the area chosen, the thresholds may or may not apply for the entire image.

Example 4

The SEA mask (FIG. 2) is a mask generated with the SeaSpace operational techniques. These routines use most but not all of the NOAA cloud removal routines and allow for further relaxation of the input parameters to the cloud and uniformity tests. Because the procedures are less restrictive, they yield a larger number of "cloud-free" pixels in the scenes. This mask was processed by W. Kastak of the Center for Space Research of the University of Texas at Austin using software commercially available from the SeaSpace Corporation, San Diego, Calif.

Example 5

The S&H cloud mask (FIG. 3) is a cloud mask processed with the Simpson Humphrey daytime cloud masking algorithm. This mask was provided by J. Simpson of the Scripps Institution of Oceanography, La Jolla, Calif.

Example 6

The NOAA cloud mask (FIG. 4) includes all the techniques used by NOAA NESDIS to remove clouds operationally from AVHRR data sets. This mask was provided by D. May of NRL-SSC.

Example 7

The NRL-SSC cloud mask (FIG. 5) is the subject of the presently disclosed invention.

Example 8

For the daytime evaluations, data from channels 1, 4 and 5 were processed. Channel 1 was utilized exclusively for cloud-masking purposes. Channels 4 and 5 were used to calculate multichannel sea surface temperature (MCSST). Channel 4 and MCSST were chosen to evaluate the performance of the various cloud masking procedures. Clouds were removed from the data with the various techniques under consideration, ensuring that for each comparison, the same algorithm was used to simultaneously remove clouds from channel 4 and the MCSST data set. The remaining cloud-free pixels were used in a regression analysis of channel 4 versus MCSST. Five regressions were carried out, one for each cloud mask: CRT, NOAA, SEA, S&H and NRL-SSC.

The best cloud mask will produce the least variability between channel 4 and MCSST data sets while yielding the largest number of cloud-free pixels in the AVHRR scene. The results of the daytime evaluations are presented in Table Ia below:

Comparison of the Daytime NRL-SSC Technique
with Other Daytime Cloud Techniques

| Technique | Cloud Free Pixels for SST | Correlation Coefficient $r^2$, Channel 4 versus MCSST |
|---|---|---|
| CRT | 485,979 | 0.91 |
| S&H | 189,471 | 0.95 |
| SEA | 61,038 | 0.96 |
| NOAA | 35,899 | 0.98 |
| NRL-SSC | 110,250 | 0.98 |

Example 9

The nighttime evaluations used the same procedures as the daytime evaluations. These comparisons include nighttime data from Apr. 10, 1989 and three cloud masks: CRT, NOAA, and NRL-SSC. Scenes containing cloud masks from these three techniques appear in FIGS. 6–8, respectively.

Example 10

For the nighttime evaluations, AVHRR image data from three thermal channels of the AVHRR instrument were processed. Channels 3, 4 and 5 were used for the MCSST computations and for the cloud masking procedures. The results of the nighttime evaluations are presented in Table Ib below:

Comparison of the Nighttime NRL-SSC Technique
with Other Nightime Cloud

| Technique | Cloud Free Pixels for SST | Correlation Coefficient $r^2$, Channel 4 Versus SST |
|---|---|---|
| CRT | 416,172 | 0.55 |
| NOAA | 198,960 | 0.80 |
| NRL-SSC | 181,748 | 0.94 |

Example 11

Each of the cloud masks used in Table 1a were compared with cloud masks produced by an experienced operator using a combination of visual interpretation of the cloud cover, manual removal of cloud contaminated pixels, and local thresholds of reflective (daytime) and infrared (nighttime) data. Each cloud mask was stored in a binary data file where cloud covered pixels were assigned values of 0 and cloud free pixels were assigned values of 1. Areas of agreement between a cloud mask and the manual cloud mask used as a "control mask" were those where both cloud masks had values of 0 and where both had values of 1. Conversely, areas of disagreement occurred where one mask had values of 1 while the other exhibited values of 0. Percentage agreement and disagreement were calculated for all masks. The results are presented in Table 2 below. The control masks for the daytime and nighttime data sets appear in FIGS. 9 and 10, respectively.

Evaluation of Various Cloud Masks With Daytime and Nighttime Masks Produced Through Human Interpretation

| Mask | Daytime Agreement % | Daytime Difference % | Nighttime Agreement % | Nighttime Difference % |
|---|---|---|---|---|
| CRT | 69.00 | 31.00 | 46.02 | 53.98 |
| S&H | 85.06 | 14.94 | — | — |
| SEA | 84.51 | 15.49 | — | — |
| NOAA | 84.27 | 15.73 | 85.07 | 14.93 |
| NRL-SSC | 88.72 | 11.28 | 88.00 | 11.00 |

Example 12

The NRL-SSC cloud mask was tested over a wide range of geographical, atmospheric and seasonal conditions. A total of 138 1-km AVHRR image data sets were used to evaluate global performance of the NRL-SSC mask. Four AVHRR image data sets from four different areas of the world's oceans were randomly selected. The areas were the Gulf of Mexico, the Persian Gulf, the North Atlantic, and the central Pacific. Two of the sets were acquired at night and two were acquired during the day. For each set, a "control mask" was produced by experienced technical personnel. As before, the cloud masks generated with NRL-SSC technique were compared with four control masks. The results of these evaluations are presented in Table 3 below:

Evaluations of the Performance of the NRL-SSC Cloud Mask at Different Locations

| Site | Date | Time, UT | Agreement % | Difference % |
|---|---|---|---|---|
| Gulf of Mexico | April 14, 1992 | 2010 | 82.00 | 18.00 |
| North Atlantic | July 19, 1991 | 0752 | 84.00 | 16.00 |
| Central Pacific | June 23, 1992 | 2239 | 97.00 | 3.00 |
| Persian Gulf | April 19, 1992 | 2311 | 86.00 | 14.00 |

```
c************************************************************
c subroutine name: cloudscreeen
c Algorithm: Sonia C. Gallegos
c programmer: Tiger Cheng (Sverdrup Technology Inc.)
c date: Feburary 25, 1992
c Purpose: Remove cloud contaminated pixels from an AVHRR data set
c          any pixel with the pixel value of -2000 is replaced by
c          the value of -3000 if it is identified as a cloud pixel
c Requirements:
c          16-bit AVHRR channel 1 is required by the day time algorithm
c          16-bit AVHRR channels 3, 4 and 5 are required by the night
c                           time algorithm
c Input arguments:
c      itype: type of data (0=night, 1=day)
c      nesdata: number of elements per line of buf1, buf2, buf3 and mask
c      nlsdata: number of scan lines of buf1, buf2, buf3 and mask
c      buf1: AVHRR channel 1 (day time)
c            AVHRR channel 3 (night time)
c      buf2: AVHRR channel 4 (night time)
c      buf3: AVHRR channel 5 (night time)
c      mask: land mask for the area of interest
c            (value -1000 = land pixels,
c             value -2000 = possible sea pixels,
c             value -3000 = identified cloud pixels,
c             value -7000 = mixed land and sea pixels,
c             value -6000 = unknown pixels)
c output argments:
c      mask: every pixel with the value of -2000 is checked and
c            replaced with the value of -3000 if it is classified
c            as a cloud pixel (edge detection subroutine edgedetect
c            ignores the first and the last columns and lines, in
c            other words, the pixels within these areas are always
c            masked off)
c      istatus: status flag (0 = normal completion)
c                           (0 < error occurs prior to completion)
c************************************************************
c
      subroutine cloudscreen(itype,nesdata,nlsdata,buf1,buf2,buf3,
     *                      mask,istatus)
      parameter (nls=512, nes=nls)
      parameter (maxareas=32768)
      integer*4 realboundpxls(maxareas),boundpxls(maxareas),
     *          areapxls(maxareas)
      integer*2 buf1(nesdata,*),buf2(nesdata,*),buf3(nesdata,*),
     *          mask(nesdata,*),ibuf(0:nes+1,0:nls+1),
     *          jbuf(0:nes+1,0:nls+1),kbuf(0:nes+1,0:nls+1),
     *          inithrs(2),minthrs(2),wxs(2),wys(2),idxs(2),idys(2),
     *          bw(2),linkrlc(nes),brlcs(2,nes),wrlcs(3,2,nes),
     *          template(nes),elerange(4,nls),areaid(maxareas)
      real boundsum(maxareas),areasum(maxareas)
      equivalence (ibuf(0,0),boundpxls(1)),(ibuf(0,129),areapxls(1)),
     *            (ibuf(0,257),boundsum(1)),(ibuf(0,385),areasum(1))
      equivalence (jbuf(0,0),realboundpxls(1)),(jbuf(0,129),areaid(1)),
     *            (jbuf(0,257),brlcs(1,1)),(jbuf(0,321),wrlcs(1,1,1)),
     *            (jbuf(0,385),linkrlc(1)),(jbuf(0,449),template(1))
      data iwr/6/
      data inithrs/100,3/
      data minthrs/40,1/
      data wxs/3,3/
      data wys/3,3/
      data idxs/1,1/
      data idys/0,1/
      data bw/0,-32768/
      data maxpass/30/
c
c check input arguments (subroutine ckargs)
```

```
c
        call ckargs(iwr,nes,nls,nesdata,nlsdata,itype,istatus)
        if(istatus .eq. 0) then
c
c set processing parameters:
c inithr: initial crossing threshold (used by subroutine clustershade)
c minthr: minimum crossing threshold (used by subroutine clustershade)
c iwx: window size in x (used by subroutine clustershade)
c iwy: window size in y (used by subroutine clustershade)
c idx: x vector (used by subroutines iplusj and clustershade)
c idy: y vector (used by subroutines iplusj and clustershade)
c
        inithr=inithrs(itype+1)
        minthr=minthrs(itype+1)
        iwx=wxs(itype+1)
        iwy=wys(itype+1)
        idx=idxs(itype+1)
        idy=idys(itype+1)
        if(itype .eq. 0) then
c
c process night time data
c 1. create two 512 by 512 night time masks by subsampling
c    (channel 3 - channel 4) and (channel 4 - channel 5)
c    (subroutine nightmasks)
c 2. run cluster shade and edge detection routines on the masks
c    (subroutines iplusj, clustershade, initialedge, clearnodata,
c           and edgedetect)
c 3. merge two masks into one (subroutine mergemasks)
c 4. create an area mask (subroutine areamask)
c 5. find the subareas constituted by the pixel value of -32768
c    (subroutines findareas)
c 6. link found subareas (subroutine linkareas)
c 7. calculate total pixel values and number of pixels for
c    areas and the boundaries surrounding the areas
c    (subroutine nightstat)
c 8. identify cloud areas (subroutine nightcloud)
c
      *   call nightmasks(iwr,nesdata,nlsdata,buf1,buf2,buf3,
                         nes,nls,ibuf,jbuf,elerange)
          call iplusj(iwr,idx,idy,nes,nls,ibuf)
      *   call clustershade(iwr,idx,idy,iwx,iwy,inithr,minthr,
                         nes,nls,ibuf,kbuf)
          call initialedge(iwr,nes,nls,ibuf,kbuf)
          call clearnodata(iwr,nes,nls,ibuf,elerange)
          call edgedetect(iwr,maxpass,nes,nls,ibuf,kbuf)
          call iplusj(iwr,idx,idy,nes,nls,jbuf)
      *   call clustershade(iwr,idx,idy,iwx,iwy,inithr,minthr,
                         nes,nls,jbuf,kbuf)
          call initialedge(iwr,nes,nls,jbuf,kbuf)
          call clearnodata(iwr,nes,nls,jbuf,elerange)
          call edgedetect(iwr,maxpass,nes,nls,jbuf,kbuf)
          call mergemasks(iwr,nes,nls,ibuf,jbuf)
          call areamask(iwr,bw,nes,nls,ibuf,kbuf,elerange)
      *   call findareas(iwr,bw,nes,nls,kbuf,brlcs,wrlcs,linkrlc,
                         elerange,nareas,areaid)
          call linkareas(iwr,nareas,areaid)
      *   call nightstat(iwr,bw,nesdata,nlsdata,buf2,nes,nls,kbuf,
      *                  elerange,nareas,areaid,areasum,areapxls,
                         boundsum,boundpxls,realboundpxls)
      *   call nightcloud(iwr,nareas,areaid,areasum,areapxls,
                         boundsum,boundpxls,realboundpxls)
c
c process day time data
c 1. create a 512 by 512 day time mask by subsampling channel 1
c    (subroutine daymask)
c 2. run cluster shade and edge detection routines on the mask
```

```
c       (subroutines iplusj, clustershade, initialedge, clearnodata,
c           edgedetect)
c  3. create an area mask (subroutine areamask)
c  4. find the subareas constituted by the pixel value of -32768
c       (subroutine findareas)
c  5. link found subareas (subroutine linkareas)
c  6. calculate number of pixels for areas and the boundaries surrounding
c       the areas (subroutine daystat)
c  7. identify cloud areas (subroutine daycloud)
c
        else
           call daymask(iwr,nesdata,nlsdata,nes,nls,buf1,ibuf,
     *            elerange)
           call iplusj(iwr,idx,idy,nes,nls,ibuf)
           call clustershade(iwr,idx,idy,iwx,iwy,inithr,minthr,
     *            nes,nls,ibuf,kbuf)
           call initialedge(iwr,nes,nls,ibuf,kbuf)
           call clearnodata(iwr,nes,nls,ibuf,elerange)
           call edgedetect(iwr,maxpass,nes,nls,ibuf,kbuf)
           call areamask(iwr,bw,nes,nls,ibuf,kbuf,elerange)
           call findareas(iwr,bw,nes,nls,kbuf,brlcs,wrlcs,linkrlc,
     *            elerange,nareas,areaid)
           call linkareas(iwr,nareas,areaid)
           call daystat(iwr,bw,nes,nls,kbuf,elerange,nareas,areaid,
     *            areapxls,realboundpxls)
           call daycloud(iwr,nareas,areaid,areapxls,realboundpxls)
        endif
c
c update subareas stored in areaid array
c (set subareas for cloud to negative values)
c
        call updateareas(iwr,nareas,areaid)
        call outputmask(iwr,nesdata,nlsdata,mask,nes,nls,kbuf,
     *            areaid)
c
      endif
      return
      end
c
c******
      subroutine outputmask(iwr,nesdata,nlsdata,mask,nes,nls,ibuf,
     *            areaid)
      integer*2 mask(nesdata,*),ibuf(0:nes+1,0:*),areaid(*)
      logical fexist
c
c
      inquire(file='temp.mask',exist=fexist)
      if(fexist) then
         open(unit=3,file='temp.mask',status='old')
         close(unit=3,status='delete')
      endif
      nbytes=nesdata+nesdata
      nwords=nbytes/4
      open(unit=3,file='temp.mask',status='new',access='direct',
     *     form='unformatted',recl=nwords)
      ln=0
      do line=1,nls
         do i=1,2
            ln=ln+1
            ie=0
            do iele=1,nes
               do j=1,2
                  ie=ie+1
                  if(ibuf(iele,line) .gt. 0) then
                     iarea=ibuf(iele,line)
                     if(areaid(iarea) .gt. 0) then
```

```
                              mask(ie,ln)=255
                          else
                              mask(ie,ln)=0
                          endif
                      else
                          mask(ie,ln)=0
                      endif
                  enddo
              enddo
           enddo
           if(mod(line,256) .eq. 0) write(iwr,*) 'line: ',line
        enddo
        do line=1,nlsdata
           write(3,rec=line) (mask(iele,line),iele=1,nesdata)
        enddo
        close(unit=3,status='keep')
        return
        end
c
c****************************************************
c subroutine overlay:
c****************************************************
c
        subroutine overlay(iwr,nesdata,nlsdata,buf,mask,nes,nls,kbuf,
       *                   areaid)
        integer*2 buf(nesdata,*),mask(nesdata,*),kbuf(0:nes+1,0:*),
       *          areaid(*)
c
c
        write(iwr,*) 'output overlay'
        ince=nesdata/nes
        incl=nlsdata/nls
        ln=0
        do line=1,nls
           do loop=1,incl
              ln=ln+1
              ie=0
              do iele=1,nes
                 do noop=1,ince
                    ie=ie+1
                    if(kbuf(iele,line) .gt. 0) then
                       iarea=kbuf(iele,line)
                       if(areaid(iarea) .lt. 0) then
                          mask(ie,ln)=0
                       else
                          mask(ie,ln)=buf(ie,ln)
                       endif
                    else
                       mask(ie,ln)=0
                    endif
                 enddo
              enddo
           enddo
        enddo
        return
        end
c
c****************************************************************
c subroutine ckargs: check input arguments
c                    nesdata and nlsdata must be both 1024
c                    itype must be either 0 or 1
c****************************************************************
c
        subroutine ckargs(iwr,nes,nls,nesdata,nlsdata,itype,istatus)
c
c
```

```
      write(iwr,10)
10    format(2x,'check input arguments')
      istatus=0
      if(nesdata .ne. nlsdata) then
          write(iwr,20)
20        format(2x,'second or third input argument is not valid')
          istatus=-1
      else
          nes2=nes+nes
          nls2=nls+nls
          if(nesdata.ne.nes2 .or. nlsdata.ne.nls2) then
              write(iwr,20)
              istatus=-1
          else
              if(itype.ne.0 .and. itype.ne.1) then
                  write(iwr,30)
30                format(2x,'first input argument is not valid')
                  istatus=-1
              endif
          endif
      endif
      return
      end
c
c************************************************************************
c subroutine nightmasks: 1. create two 512 by 512 masks by sampling
c                           channel 3 - channel 4, channel 4 - channel 5
c                        2. find the range of valid data in each line
c************************************************************************
c
      subroutine nightmasks(iwr,nesdata,nlsdata,buf1,buf2,buf3,
     *                     nes,nls,ibuf,jbuf,elerange)
      integer*2 buf1(nesdata,*),buf2(nesdata,*),buf3(nesdata,*),
     *          ibuf(0:nes+1,0:*),jbuf(0:nes+1,0:*),elerange(4,*)
c
c
      write(iwr,10)
10    format(2x,'create night time masks')
      do iele=0,nes+1
          ibuf(iele,0)=0
          ibuf(iele,nls+1)=0
          jbuf(iele,0)=0
          jbuf(iele,nls+1)=0
      enddo
      ince=nesdata/nes
      incl=nlsdata/nls
      ln=0
      do line=1,nlsdata,incl
          ln=ln+1
          ibuf(0,ln)=0
          jbuf(0,ln)=0
          elerange(1,ln)=0
          elerange(2,ln)=0
          ie=0
          do iele=1,nesdata,ince
              ie=ie+1
              ibuf(ie,ln)=buf1(iele,line)-buf2(iele,line)
              jbuf(ie,ln)=buf2(iele,line)-buf3(iele,line)
              if(buf1(iele,line).ne.0 .or. buf2(iele,line).ne.0 .or.
     *           buf3(iele,line).ne.0) then
                  if(elerange(1,ln) .eq. 0) elerange(1,ln)=ie
                  elerange(2,ln)=ie
              endif
          enddo
          ibuf(nes+1,ln)=0
          jbuf(nes+1,ln)=0
```

```
          enddo
          return
          end
c
c*******************************************************************
c subroutine daymask: 1. create a 512 by 512 mask by subsampling
c                        channel 1
c                     2. find range of valid data in each line
c*******************************************************************
c
      subroutine daymask(iwr,nesdata,nlsdata,nes,nls,bufl,ibuf,
     *                   elerange)
      integer*2 bufl(nesdata,*),ibuf(0:nes+1,0:*),elerange(4,*)
c
c
      write(iwr,10)
10    format(2x,'create day time mask')
      do iele=0,nes+1
         ibuf(iele,0)=0
         ibuf(iele,nls+1)=0
      enddo
      ince=nesdata/nes
      incl=nlsdata/nls
      ln=0
      do line=1,nlsdata,incl
         ln=ln+1
         ibuf(0,ln)=0
         elerange(1,ln)=0
         elerange(2,ln)=0
         ie=0
         do iele=1,nesdata,ince
            ie=ie+1
            ibuf(ie,ln)=bufl(iele,line)
            if(ibuf(ie,ln) .ne. 0) then
               if(elerange(1,ln) .eq. 0) elerange(1,ln)=ie
               elerange(2,ln)=ie
            endif
         enddo
         ibuf(nes+1,ln)=0
      enddo
      return
      end
c
c*******************************************************************
c subroutine iplusj: create i+j image and store it in ibuf
c*******************************************************************
c
      subroutine iplusj(iwr,idx,idy,nes,nls,ibuf)
      integer*2 ibuf(0:nes+1,0:*)
c
c
      write(iwr,10)
10    format(2x,'create i+j image')
      le=nes-idx
      ll=nls-idy
      do line=1,ll
         do iele=1,le
            ibuf(iele,line)=ibuf(iele,line)+ibuf(iele+idx,line+idy)
         enddo
      enddo
      return
      end
c
c*******************************************************************
c subroutine clustershade: create cluster shade image and store it in
c                          jbuf
```

```
c*********************************************************************
c
      subroutine clustershade(iwr,idx,idy,nwx,nwy,inithr,minthr,
     *                       nes,nls,ibuf,jbuf)
      integer*2 ibuf(0:nes+1,0:*),jbuf(0:nes+1,0:*)
c
c
      write(iwr,10)
10    format(2x,'create cluster shade image')
      neginithr=-inithr
      negminthr=-minthr
      il=1+(nwy-1)/2
      ll=nls-(nwy-1)/2
      ie=1+(nwx-1)/2
      le=nes-(nwx-1)/2
      iwx=nwx-idx
      iwy=nwy-idy
      wxy=iwx*iwy
      wt=1./wxy
      wtneg=-wt
c
c
      do line=0,il-1
         do iele=0,nes+1
            jbuf(iele,line)=0
         enddo
      enddo
      ilmove=1
      llmove=iwy
      ibuf(0,0)=0
      do iele=1,nes
         ibuf(iele,0)=0
         do line=ilmove,llmove
            ibuf(iele,0)=ibuf(iele,0)+ibuf(iele,line)
         enddo
      enddo
      ibuf(nes+1,0)=0
c
c
      do line=il,ll
         do iele=0,ie-1
            jbuf(iele,line)=0
         enddo
         iemove=1
         lemove=iwx
         irunsum=0
         do iele=iemove,lemove
            irunsum=irunsum+ibuf(iele,0)
         enddo
         do iele=ie,le
            xmu=irunsum*wtneg
            csv=0.
            do l=ilmove,llmove
               do i=iemove,lemove
                  v=ibuf(i,l)+xmu
                  csv=csv+v*v*v
               enddo
            enddo
            csv=csv*wt
            if(csv .ge. inithr) then
               jbuf(iele,line)=2
            else
               if(csv .le. neginithr) then
                  jbuf(iele,line)=-2
               else
                  if(csv .ge. minthr) then
```

```fortran
                        jbuf(iele,line)=1
                    else
                        if(csv .le. negminthr) then
                            jbuf(iele,line)=-1
                        else
                            jbuf(iele,line)=0
                        endif
                    endif
                endif
            endif
            lemove=lemove+1
            irunsum=irunsum-ibuf(iemove,0)+ibuf(lemove,0)
            iemove=iemove+1
        enddo
        do iele=le+1,nes+1
            jbuf(iele,line)=0
        enddo
        llmove=llmove+1
        do iele=1,nes
            ibuf(iele,0)=ibuf(iele,0)-ibuf(iele,ilmove)
     *                     +ibuf(iele,llmove)
        enddo
        ilmove=ilmove+1
    enddo
c
c
    do line=ll+1,nls+1
        do iele=0,nes+1
            jbuf(iele,line)=0
        enddo
    enddo
    return
    end
c
c*******************************************************************
c subroutine initialedge: create initial edge detection image and
c                         store it in ibuf
c*******************************************************************
c
    subroutine initialedge(iwr,nes,nls,ibuf,jbuf)
    integer*2 ibuf(0:nes+1,0:*),jbuf(0:nes+1,0:*)
c
c
    write(iwr,10)
10  format(2x,'create initial edge detection image')
    do line=1,nls
        do iele=1,nes
            if(jbuf(iele,line).eq.-2 .or.
     *         jbuf(iele,line).eq.2) then
                icode=-jbuf(iele,line)
                if(jbuf(iele-1,line-1).eq.icode .or.
     *             jbuf(iele,line-1)   .eq.icode .or.
     *             jbuf(iele+1,line-1) .eq.icode .or.
     *             jbuf(iele-1,line)   .eq.icode .or.
     *             jbuf(iele+1,line)   .eq.icode .or.
     *             jbuf(iele-1,line+1) .eq.icode .or.
     *             jbuf(iele,line+1)   .eq.icode .or.
     *             jbuf(iele+1,line+1) .eq.icode) then
                    ibuf(iele,line)=1
                else
                    ibuf(iele,line)=0
                endif
            else
                ibuf(iele,line)=0
            endif
        enddo
```

```
          enddo
          return
          end
c
c*******************************************************************
c subroutine clearnodata: clear no data area from each scan line
c*******************************************************************
c
          subroutine clearnodata(iwr,nes,nls,ibuf,elerange)
          integer*2 ibuf(0:nes+1,0:*),elerange(4,*)
c
c
          write(iwr,10)
10        format(2x,'clear no data areas')
          do iele=0,nes+1
             ibuf(iele,0)=1
             ibuf(iele,1)=1
             ibuf(iele,nls)=1
             ibuf(iele,nls+1)=1
          enddo
          do line=2,nls-1
             ibuf(0,line)=1
             ibuf(1,line)=1
             do iele=2,elerange(1,line)-1
                ibuf(iele,line)=1
             enddo
             do iele=elerange(2,line)+1,nes-1
                ibuf(iele,line)=1
             enddo
             ibuf(nes,line)=1
             ibuf(nes+1,line)=1
          enddo
          return
          end
c
c*******************************************************************
c subroutine edgedetect: detect/extend edge pixels (pixel value 0) until
c                        either no new edge pixels are found or the number
c                        of passes is greater than the maximum number of
c                        passes allowed
c                        the image with extended edges are stored in ib
c*******************************************************************
c
          subroutine edgedetect(iwr,maxpass,nes,nls,ib,jb)
          integer*2 ib(0:nes+1,0:*),jb(0:nes+1,0:*)
          logical finish
c
c
          ipass=0
          finish=.false.
          do while(.not.finish)
             ipass=ipass+1
             ic=ipass+1
             npixels=0
             do l=2,nls-1
                do i=2,nes-1
                   if(ib(i,l).eq.0 .and. jb(i,l).ne.0) then
                      if((ib(i-1,l-1).gt.0 .and. ib(i-1,l-1).lt.ic) .or.
     *                   (ib(i,l-1)   .gt.0 .and. ib(i,l-1)   .lt.ic) .or.
     *                   (ib(i+1,l-1).gt.0 .and. ib(i+1,l-1).lt.ic) .or.
     *                   (ib(i-1,l)   .gt.0 .and. ib(i-1,l)   .lt.ic) .or.
     *                   (ib(i+1,l)   .gt.0 .and. ib(i+1,l)   .lt.ic) .or.
     *                   (ib(i-1,l+1).gt.0 .and. ib(i-1,l+1).lt.ic) .or.
     *                   (ib(i,l+1)   .gt.0 .and. ib(i,l+1)   .lt.ic) .or.
     *                   (ib(i+1,l+1).gt.0 .and. ib(i+1,l+1).lt.ic)) then
                         if(jb(i,l) .gt. 0) then
```

```
                            if(jb(i-1,l-1).lt.0 .or.
     *                         jb(i,l-1)   .lt.0 .or.
     *                         jb(i+1,l-1).lt.0 .or.
     *                         jb(i-1,l)   .lt.0 .or.
     *                         jb(i+1,l)   .lt.0 .or.
     *                         jb(i-1,l+1).lt.0 .or.
     *                         jb(i,l+1)   .lt.0 .or.
     *                         jb(i+1,l+1).lt.0) then
                              ib(i,l)=ic
                              npixels=npixels+1
                            endif
                         else
                            if(jb(i-1,l-1).gt.0 .or.
     *                         jb(i,l-1)   .gt.0 .or.
     *                         jb(i+1,l-1).gt.0 .or.
     *                         jb(i-1,l)   .gt.0 .or.
     *                         jb(i+1,l)   .gt.0 .or.
     *                         jb(i-1,l+1).gt.0 .or.
     *                         jb(i,l+1)   .gt.0 .or.
     *                         jb(i+1,l+1).gt.0) then
                              ib(i,l)=ic
                              npixels=npixels+1
                            endif
                         endif
                      endif
                   endif
                enddo
             enddo
             write(iwr,20) ipass,npixels
  20         format(2x,'pass number: ',i2,', new edge pixels added: ',
     *              i6)
             if(npixels.eq.0 .or. ipass.ge.maxpass) finish=.true.
          enddo
          return
          end
c
c*********************************************************************
c subroutine mergemasks: merge two edge detection images (night time only)
c                        if same pixel in both buffers are 0, the pixel
c                        is set to 0, otherwise it is set to 1
c*********************************************************************
c
          subroutine mergemasks(iwr,nes,nls,ibuf,jbuf)
          integer*2 ibuf(0:nes+1,0:*),jbuf(0:nes+1,0:*)
c
c
          write(iwr,10)
  10      format(2x,'merge edge detection buffers')
          do line=1,nls
             do iele=1,nes
                if(ibuf(iele,line).eq.0 .and.
     *             jbuf(iele,line).gt.0) ibuf(iele,line)=1
             enddo
          enddo
          return
          end
c
c*********************************************************************
c subroutine areamask: 1. create initial area mask
c                         set pixel in ibuf = 0 to -32768
c                             pixel in ibuf > 0 to  0
c                         any isolated pixel of 0 is set to 0
c                      2. find beginning end ending pixels with the value
c                         of -32768 in each line
c                         the output mask is stored in ibuf
c                         areas constituted by the pixel value of -32768
```

```
c                         are the areas to be classified as cloud or water
c*********************************************************************
c
      subroutine areamask(iwr,bw,nes,nls,ibuf,jbuf,elerange)
      integer*2 bw(*),ibuf(0:nes+1,0:*),jbuf(0:nes+1,0:*),
     *          elerange(4,*)
c
c
      write(iwr,10)
10    format(2x,'create area mask')
      do iele=0,nes+1
         jbuf(iele,0)=bw(1)
         jbuf(iele,nls+1)=bw(1)
      enddo
      npxls=0
      mpxls=0
      do line=1,nls
         elerange(3,line)=0
         elerange(4,line)=-3
         jbuf(0,line)=bw(1)
         do iele=1,nes
            if(ibuf(iele,line) .eq. 0) then
               if(ibuf(iele-1,line-1).eq.0 .or.
     *            ibuf(iele,line-1)   .eq.0 .or.
     *            ibuf(iele+1,line-1).eq.0 .or.
     *            ibuf(iele-1,line)   .eq.0 .or.
     *            ibuf(iele+1,line)   .eq.0 .or.
     *            ibuf(iele-1,line+1).eq.0 .or.
     *            ibuf(iele,line+1)   .eq.0 .or.
     *            ibuf(iele+1,line+1).eq.0) then
                  jbuf(iele,line)=bw(2)
                  if(elerange(3,line) .eq. 0) elerange(3,line)=iele
                  elerange(4,line)=iele
                  mpxls=mpxls+1
               else
                  npxls=npxls+1
                  jbuf(iele,line)=bw(1)
               endif
            else
               jbuf(iele,line)=bw(1)
            endif
         enddo
         jbuf(nes+1,line)=bw(1)
      enddo
      write(6,*) 'number of white pixels: ',mpxls
      write(6,*) 'number of single pixels: ',npxls
      return
      end
c
c*********************************************************************
c subroutine findareas: find areas constituted by the pixel value of -32768
c*********************************************************************
c
      subroutine findareas(iwr,bw,nes,nls,ibuf,brlcs,wrlcs,linkrlc,
     *                     elerange,nareas,areaid)
      integer*2 bw(*),ibuf(0:nes+1,0:*),brlcs(2,*),wrlcs(3,2,*),
     *          linkrlc(*),elerange(4,*),areaid(*)
      integer*4 swap(2),nwrlcs(2)
      logical find
      data swap/2,1/
c
c
      write(iwr,10)
10    format(2x,'find areas')
      l1=1
      l2=2
```

```
        nwrlcs(1)=0
        nbrlcs=1
        brlcs(1,1)=0
        brlcs(2,1)=nes+1
        nareas=0
c
c
        do line=2,nls-1
c
c find white (-32768) rlcs from current line
c
            nwrlcs(12)=0
            if(elerange(3,line) .le. elerange(4,line)) then
               ib=-1
               ie=-1
               do iele=elerange(3,line),elerange(4,line)+1
                  if(ibuf(iele,line) .eq. bw(2)) then
                     if(ib .eq. -1) ib=iele
                     ie=iele
                  else
                     if(ib .gt. -1) then
                        nwrlcs(12)=nwrlcs(12)+1
                        wrlcs(1,12,nwrlcs(12))=ib
                        wrlcs(2,12,nwrlcs(12))=ie
                        wrlcs(3,12,nwrlcs(12))=0
                        ib=-1
                     endif
                  endif
               enddo
c
c find beginning of a new subarea
c
               if(nbrlcs .gt. 0) then
                  do iwrlc=1,nwrlcs(12)
                     find=.false.
                     ibrlc=0
                     do while(.not.find .and. ibrlc.lt.nbrlcs)
                        ibrlc=ibrlc+1
                        if(wrlcs(1,12,iwrlc).gt.brlcs(1,ibrlc) .and.
     *                     wrlcs(2,12,iwrlc).lt.brlcs(2,ibrlc)) then
                           find=.true.
                           nareas=nareas+1
                           areaid(nareas)=nareas
                           wrlcs(3,12,iwrlc)=nareas
                           do iele=wrlcs(1,12,iwrlc),wrlcs(2,12,iwrlc)
                              ibuf(iele,line)=nareas
                           enddo
                        endif
                     enddo
                  enddo
               endif
            endif
c
c link rest of rlcs with the subareas defined in the previous line
c
            if(nwrlcs(11) .gt. 0) then
               do iwrlc=1,nwrlcs(12)
                  if(wrlcs(3,12,iwrlc) .le. 0) then
                     linkrlcs=0
                     do jwrlc=1,nwrlcs(11)
                        jb=wrlcs(1,11,jwrlc)-1
                        je=wrlcs(2,11,jwrlc)+1
                        if(.not.(wrlcs(1,12,iwrlc).gt.je .or.
     *                           wrlcs(2,12,iwrlc).lt.jb)) then
                           linkrlcs=linkrlcs+1
                           linkrlc(linkrlcs)=jwrlc
                           jarea=wrlcs(3,11,jwrlc)
```

```
                        if(linkrlcs .eq. 1) then
                            karea=areaid(jarea)
                        else
                            if(areaid(jarea) .lt. karea) then
                                karea=areaid(jarea)
                            endif
                        endif
                    endif
                enddo
c
c
                if(linkrlcs .ge. 1) then
                    do iele=wrlcs(1,12,iwrlc),wrlcs(2,12,iwrlc)
                        ibuf(iele,line)=karea
                    enddo
                    wrlcs(3,12,iwrlc)=karea
                    if(linkrlcs .ge. 2) then
                        do link=1,linkrlcs
                            jwrlc=linkrlc(link)
                            jarea=wrlcs(3,11,jwrlc)
                            jarea=areaid(jarea)
                            if(jarea .gt. karea) areaid(jarea)=karea
                        enddo
                    endif
                endif
            endif
        enddo
    endif
c
c find black (0) rlcs from current line
c
    brlcs(1,1)=0
    brlcs(2,1)=elerange(3,line)-1
    nbrlcs=1
    ib=-1
    ie=-1
    do iele=elerange(3,line)+1,elerange(4,line)
        if(ibuf(iele,line) .eq. bw(1)) then
            if(ib .eq. -1) ib=iele
            ie=iele
        else
            if(ib .gt. -1) then
                nbrlcs=nbrlcs+1
                brlcs(1,nbrlcs)=ib
                brlcs(2,nbrlcs)=ie
                ib=-1
            endif
        endif
    enddo
    nbrlcs=nbrlcs+1
    brlcs(1,nbrlcs)=elerange(4,line)+1
    brlcs(2,nbrlcs)=nes+1
else
    nbrlcs=1
    brlcs(1,1)=0
    brlcs(2,1)=nes+1
endif
l1=l2
l2=swap(l2)
    enddo
    return
    end
c
c****************************************************************
c subroutine linkareas: link connected subareas
c                       all subareas will have the same ID value
```

-47-

```
c*********************************************************************
c
      subroutine linkareas(iwr,nareas,areaid)
      integer*2 areaid(*)
c
c
      write(iwr,10) nareas
10    format(2x,'link connected areas: ',i5)
      do iarea=1,nareas
         if(iarea .ne. areaid(iarea)) then
            jarea=areaid(iarea)
            do while(jarea .ne. areaid(jarea))
               jarea=areaid(jarea)
            enddo
            areaid(iarea)=jarea
         endif
      enddo
      return
      end
c
c*********************************************************************
c subroutine nightstat: calculate statistics for night time areas
c                       1. number of pixels for the boundary surrounding
c                          an area
c                       2. total pixel value for the boundary
c                       3. number of pixels for the area
c                       4. total pixel value for the area
c                       pixels on the limits of the entire good data area
c                       are treated as pixel value of 0
c*********************************************************************
c
      subroutine nightstat(iwr,bw,nesdata,nlsdata,buf,nes,nls,ibuf,
     *                    elerange,nareas,areaid,areasum,areapxls,
     *                    boundsum,boundpxls,realboundpxls)
      integer*2 bw(*),buf(nesdata,*),ibuf(0:nes+1,0:*),elerange(4,*),
     *          areaid(*)
      integer*4 areapxls(*),boundpxls(*),realboundpxls(*),
     *          index(3),neighbor(8)
      real areasum(*),boundsum(*)
      logical areaexist
      data index/1,2,1/
c
c
      write(iwr,10)
10    format(2x,'calculate total pixel value and number of pixels',
     *       ' for areas')
      do iarea=1,nareas
         areasum(iarea)=0.
         areapxls(iarea)=0
         boundsum(iarea)=0.
         boundpxls(iarea)=0
         realboundpxls(iarea)=0
      enddo
c
c
      minl=0
      maxl=0
      do line=2,nls-1
         if(elerange(3,line) .gt. 0) then
            if(minl .eq. 0) minl=line
            maxl=line
         endif
      enddo
      minl=minl-1
      maxl=maxl+1
      ince=nesdata/nes
```

```
        incl=nlsdata/nls
        ln=(minl-1)*incl+1
        do line=minl,maxl
            if(elerange(1,line) .gt. 1) then
                mine=elerange(1,line)-1
            else
                mine=1
            endif
            if(elerange(2,line) .lt. nes) then
                maxe=elerange(2,line)+1
            else
                maxe=nes
            endif
            ie=(mine-1)*ince+1
            do iele=mine,maxe
                if(ibuf(iele,line) .gt. bw(l)) then
                    iarea=ibuf(iele,line)
                    iarea=areaid(iarea)
                    areapxls(iarea)=areapxls(iarea)+1
                    areasum(iarea)=areasum(iarea)+buf(ie,ln)
                else
                    neighbors=0
                    l=line-2
                    do i=1,3
                        l=l+1
                        do j=iele-1,iele+1,index(i)
                            if(ibuf(j,l) .gt. bw(l)) then
                                iarea=ibuf(j,l)
                                iarea=areaid(iarea)
                                areaexist=.false.
                                k=0
                                do while(.not.areaexist .and.
     *                                   k.lt.neighbors)
                                    k=k+1
                                    if(neighbor(k) .eq. iarea) then
                                        areaexist=.true.
                                    endif
                                enddo
                                if(.not.areaexist) then
                                    if((iele.gt.mine .and. iele.lt.maxe) .and.
     *                                  (line.gt.1 .and. line.lt.nls)) then
                                        boundpxls(iarea)=boundpxls(iarea)+1
                                        boundsum(iarea)=boundsum(iarea)
     *                                                  +buf(ie,ln)
                                    endif
                                    realboundpxls(iarea)=realboundpxls(iarea)
     *                                                   +1
                                    neighbors=neighbors+1
                                    neighbor(neighbors)=iarea
                                endif
                            endif
                        enddo
                    enddo
                endif
                ie=ie+ince
            enddo
            ln=ln+incl
        enddo
        return
        end
c
c*****************************************************************
c subroutine daystat: calculate statistics for day time areas
c                     1. number of pixels for the boundary surrounding
c                        an area
c                     2. number of pixels of the area
```

```
c                pixels on the limits of the entire good data
c                area are treated as pixel value of 0
c**********************************************************************
c
      subroutine daystat(iwr,bw,nes,nls,ibuf,elerange,nareas,areaid,
     *                   areapxls,realboundpxls)
      integer*2 bw(*),ibuf(0:nes+1,0:*),elerange(4,*),areaid(*)
      integer*4 areapxls(*),realboundpxls(*),index(3),neighbor(8)
      logical areaexist
      data index/1,2,1/
c
c
      write(iwr,10)
10    format(2x,'calculate number of pixels for areas')
      do iarea=1,nareas
         areapxls(iarea)=0
         realboundpxls(iarea)=0
      enddo
c
c
      minl=0
      maxl=0
      do line=2,nls-1
         if(elerange(3,line) .gt. 0) then
            if(minl .eq. 0) minl=line
            maxl=line
         endif
      enddo
      minl=minl-1
      maxl=maxl+1
      do line=minl,maxl
         if(elerange(1,line) .gt. 1) then
            mine=elerange(1,line)-1
         else
            mine=1
         endif
         if(elerange(2,line) .lt. nes) then
            maxe=elerange(2,line)+1
         else
            maxe=nes
         endif
         do iele=mine,maxe
            if(ibuf(iele,line) .gt. bw(1)) then
               iarea=ibuf(iele,line)
               iarea=areaid(iarea)
               areapxls(iarea)=areapxls(iarea)+1
            else
               neighbors=0
               l=line-2
               do i=1,3
                  l=l+1
                  do j=iele-1,iele+1,index(i)
                     if(ibuf(j,l) .gt. bw(1)) then
                        iarea=ibuf(j,l)
                        iarea=areaid(iarea)
                        areaexist=.false.
                        k=0
                        do while(.not.areaexist .and.
     *                           k.lt.neighbors)
                           k=k+1
                           if(neighbor(k) .eq. iarea) then
                              areaexist=.true.
                           endif
                        enddo
                        if(.not.areaexist) then
                           neighbors=neighbors+1
```

```
                              neighbor(neighbors)=iarea
                              realboundpxls(iarea)=realboundpxls(iarea)
     *                                                                +1
                         endif
                      endif
                   enddo
                enddo
             endif
          enddo
       enddo
       return
       end
c
c***************************************************************
c subroutine nightcloud: identify cloud areas for night time data
c                        cloud area test:
c                        if
c                           Number of pixels of the boundary is greater
c                           than number of pixels of the area
c                        else
c                           the pixel average of the area is smaller
c                           than or equal to the pixel average of the
c                           boundary
c                        endif
c                        the ID value stored in the areaid array is
c                        set to negative if the area is identified
c                        as cloud
c***************************************************************
c
       subroutine nightcloud(iwr,nareas,areaid,areasum,areapxls,
     *                 boundsum,boundpxls,realboundpxls)
       integer*2 areaid(*)
       integer*4 areapxls(*),boundpxls(*),realboundpxls(*)
       real areasum(*),boundsum(*)
c
c
       write(iwr,10)
10     format(2x,'identify cloud areas for night time data')
       do iarea=1,nareas
          if(areaid(iarea) .eq. iarea) then
             if(realboundpxls(iarea) .le. areapxls(iarea)) then
                if(boundpxls(iarea) .gt. 0) then
                   areamean=areasum(iarea)/areapxls(iarea)
                   boundmean=boundsum(iarea)/boundpxls(iarea)
                   if(areamean .le. boundmean) areaid(iarea)=-iarea
                endif
             else
                areaid(iarea)=-iarea
             endif
          endif
       enddo
       return
       end
c
c***************************************************************
c subroutine daycloud: identify cloud areas for day time data
c                      cloud area test:
c                      if
c                         number of pixels of the boundary is greater
c                         than the number of pixels of the area
c                      endif
c                      the ID value stored in the areaid array is set
c                      to negative if the area is identified as cloud
c***************************************************************
c
       subroutine daycloud(iwr,nareas,areaid,areapxls,realboundpxls)
```

```
      integer*2 areaid(*)
      integer*4 areapxls(*),realboundpxls(*)
c
c
      write(iwr,10)
10    format(2x,'identify cloud areas for day time data')
      do iarea=1,nareas
         if(areaid(iarea) .eq. iarea) then
            if(realboundpxls(iarea) .gt. areapxls(iarea)) then
               areaid(iarea)=-iarea
            endif
         endif
      enddo
      nclouds=0
      nwaters=0
      do iarea=1,nareas
         if(areaid(iarea) .eq. iarea) then
            nwaters=nwaters+1
         else
            if(areaid(iarea) .eq. -iarea) then
               nclouds=nclouds+1
            endif
         endif
      enddo
      write(6,*) 'clouds,waters: ',nclouds,nwaters
      return
      end
c
c*****************************************************************
c subroutine updateareas: update areaid array
c                         set all subareas for cloud to negative
c                         values
c*****************************************************************
c
      subroutine updateareas(iwr,nareas,areaid)
      integer*2 areaid(*)
c
c
      write(iwr,10)
10    format(2x,'update areaid')
      do iarea=1,nareas
         if(areaid(iarea) .gt. 0) then
            if(areaid(iarea) .ne. iarea) then
               jarea=areaid(iarea)
               if(areaid(jarea) .lt. 0) areaid(iarea)=areaid(jarea)
            endif
         endif
      enddo
      return
      end
c
c*****************************************************************
c subroutine markcloud: mark cloud pixels in mask array with the
c                       value of -3000
c*****************************************************************
c
      subroutine markcloud(iwr,bw,nesdata,nlsdata,mask,nes,nls,ibuf,
     *                    template,areaid)
      integer*2 bw(*),mask(nesdata,*),ibuf(0:nes+1,0:*),
     *          template(*),areaid(*)
c
c
      write(iwr,10)
10    format(2x,'mark cloud pixels in mask array')
      ince=nesdata/nes
      incl=nlsdata/nls
```

```
ln=0
do line=1,nls
   le=0
   do iele=1,nes
      if(ibuf(iele,line) .gt. bw(l)) then
         iarea=ibuf(iele,line)
         if(areaid(iarea) .gt. 0) then
            icode=1
         else
            icode=0
         endif
      else
         icode=-1
      endif
      do loop=1,ince
         le=le+1
         template(le)=icode
      enddo
   enddo
   do loop=1,incl
      ln=ln+1
      do ie=1,le
         if(mask(ie,ln) .eq. -2000) then
            if(template(ie) .le. 0) mask(ie,ln)=-3000
         endif
      enddo
   enddo
enddo
return
end
```

What is claimed is:

1. An apparatus for cloud masking of an advanced very high resolution radiometer (AVHRR) image of a body of water, said image containing cloud-contaminated pixels, said apparatus comprising:
   (a) a means for obtaining AVHRR sea surface temperature measurements over said body of water;
   (b) channel 1 means operating at 585–685 nm to obtain albedo data over said body of water;
   (c) a means for edge generation from said albedo data;
   (d) a means for connecting said edges to form one or more closed boundaries, said one or more closed boundaries defining one or more polygons;
   (e) a means for determining whether said one or more polygons contain said cloud contaminated pixels;
   (f) a means for identifying said one or more polygons determined to contain said cloud contaminated pixels;
   (g) a means for forming a cloud mask of said one or more identified cloud contaminated polygons; and
   (h) a means for deleting said AVHRR sea surface temperature measurements corresponding to said cloud mask.

2. The apparatus of claim 1 wherein said element (e) further comprises:
   (i) a means for comparing said albedo data of said one or more closed boundaries with said albedo data of said one or more polygons defined by said one or more closed boundaries.

3. An apparatus for cloud masking of an advanced very high resolution radiometer (AVHRR) image of a body of water, said image containing cloud-contaminated pixels, said apparatus comprising:
   (a) a means for obtaining AVHRR sea surface temperature measurements over said body of water;
   (b) channel 3, 4 and 5 means operating at 3,575–3983 nm, 10,362–11,299 nm and 11450–12424 nm, respectively, to obtain brightness temperature data over said body of water;
   (c) a means for edge generation from said brightness temperature data;
   (d) a means for connecting said edges to form one or more closed boundaries, said one or more closed boundaries defining one or more polygons;
   (e) a means for determining whether said one or more polygons contain said cloud contaminated pixels;
   (f) a means for identifying said one or more polygons determined to contain said cloud contaminated pixels;
   (g) a means for forming a cloud mask of said one or more identified cloud contaminated polygons; and
   (h) a means for deleting said AVHRR sea surface temperature measurements corresponding to said cloud mask.

4. The apparatus of claim 3 wherein said element (e) further comprises:
   (i) a means for comparing said brightness temperature data of said one or more closed boundaries with said brightness temperature data of said one or more polygons defined by said one or more closed boundaries.

5. A method for cloud masking of an advanced very high resolution radiometer (AVHRR) image of a body of water, said image containing cloud-contaminated pixels, said method comprising the steps of:
   (a) obtaining AVHRR sea surface temperature measurements over said body of water;
   (b) obtaining channel 1 albedo data at 585–685 nm over said body of water;
   (c) generating one or more edges from said albedo data;
   (d) connecting said edges to form one or more closed boundaries, said one or more closed boundaries defining one or more polygons;
   (e) determining whether said one or more polygons contain said cloud-contaminated pixels;
   (f) identifying said one or more polygons determined to contain said cloud contaminated pixels;
   (g) forming a cloud mask of said one or more identified cloud contaminated polygons; and
   (h) deleting said AVHRR sea surface temperature measurements corresponding to said cloud mask.

6. The method of claim 5 wherein said step (e) further comprises the step of:
   (i) comparing said albedo data of said one or more closed boundaries with said albedo data of said one or more polygons defined by said one or more closed boundaries.

7. An process for cloud masking of an advanced very high resolution radiometer (AVHRR) image of a body of water, said image containing cloud-contaminated pixels, said process comprising the steps of:
   (a) obtaining AVHRR sea surface temperature measurements over said body of water;
   (b) obtaining channel 3, 4 and 5 temperature brightness data at 3,575–3983 nm, 10,362–11,299 nm and 11450–12424 nm, respectively, over said body of water;
   (c) generating one or more edges from said temperature brightness data;
   (d) connecting said edges to form one or more closed boundaries, said one or more closed boundaries defining one or more polygons;
   (e) determining whether said one or more polygons contain said cloud-contaminated pixels;
   (f) forming a cloud mask of said one or more identified cloud contaminated pixels; and
   (g) deleting said AVHRR sea surface temperature measurements corresponding to said cloud mask.

8. The process of claim 7 wherein said step (e) further comprises the step of:
   (i) comparing said brightness temperature data of said one or more closed boundaries with said brightness temperature data of said one or more polygons defined by said one or more closed boundaries.

9. An apparatus for cloud masking of an advanced very high resolution radiometer (AVHRR) image of a body of water, said image containing cloud-contaminated pixels, said apparatus comprising:
   (a) a means for obtaining AVHRR sea surface temperature measurements over said body of water;
   (b) channel 1 means operating at 585–685 nm to obtain albedo data over said body of water;
   (c) a means for edge generation from said albedo data;
   (d) a means for connecting said edges to form one or more closed boundaries, said one or more closed boundaries defining one or more polygons;
   (e) a means for determining whether said one or more polygons contain said cloud contaminated pixels;
   (f) a means for identifying said one or more polygons determined to contain said cloud contaminated pixels; and (g) a means for forming a cloud mask of said one or more identified cloud contaminated polygons.

10. The apparatus of claim 9 wherein said element (e) further comprises:

(i) a means for comparing said albedo data of said one or more closed boundaries with said albedo data of said one or more polygons defined by said one or more closed boundaries.

11. An apparatus for cloud masking of an advanced very high resolution radiometer (AVHRR) image of a body of water, said image containing cloud-contaminated pixels, said apparatus comprising:

(a) a means for obtaining AVHRR sea surface temperature measurements over said body of water;

(b) channel 3, 4 and 5 means operating at 3,575–3983 nm, 10,362–11,299 nm and 11450–12424 nm, respectively, to obtain brightness temperature data over said body of water;

(c) a means for edge generation from said brightness temperature data;

(d) a means for connecting said edges to form one or more closed boundaries, said one or more closed boundaries defining one or more polygons;

(e) a means for determining whether said one or more polygons contain said cloud contaminated pixels;

(f) a means for identifying said one or more polygons determined to contain said cloud contaminated pixels; and (g) a means for forming a cloud mask of said one or more identified cloud contaminated polygons.

12. The apparatus of claim 11 wherein said element (e) further comprises:

(i) a means for comparing said brightness temperature data of said one or more closed boundaries with said brightness temperature data of said one or more polygons defined by said one or more closed boundaries.

13. A method for cloud masking of an advanced very high resolution radiometer (AVHRR) image of a body of water, said image containing cloud-contaminated pixels, said method comprising the steps of:

(a) obtaining AVHRR sea surface temperature measurements over said body of water;

(b) obtaining channel 1 albedo data at 585–685 nm over said body of water;

(c) generating one or more edges from said albedo data;

(d) connecting said edges to form one or more closed boundaries, said one or more closed boundaries defining one or more polygons;

(e) determining whether said one or more polygons contain said cloud-contaminated pixels;

(f) identifying said one or more polygons determined to contain said cloud contaminated pixels; and (g) forming a cloud mask of said one or more identified cloud contaminated polygons.

14. The method of claim 13 wherein said step (e) further comprises the step of:

(i) comparing said albedo data of said one or more closed boundaries with said albedo data of said one or more polygons defined by said one or more closed boundaries.

15. An process for cloud masking of an advanced very high resolution radiometer (AVHRR) image of a body of water, said image containing cloud-contaminated pixels, said process comprising the steps of:

(a) obtaining AVHRR sea surface temperature measurements over said body of water;

(b) obtaining channel 3, 4 and 5 temperature brightness data at 3,575–3983 nm, 10,362–11,299 nm and 11450–12424 nm, respectively, over said body of water;

(c) generating one or more edges from said temperature brightness data;

(d) connecting said edges to form one or more closed boundaries, said one or more closed boundaries defining one or more polygons;

(e) determining whether said one or more polygons contain said cloud-contaminated pixels; and (f) forming a cloud mask of said one or more identified cloud contaminated pixels.

16. The process of claim 15 wherein said step (e) further comprises the step of:

(i) comparing said brightness temperature data of said one or more closed boundaries with said brightness temperature data of said one or more polygons defined by said one or more closed boundaries.

* * * * *